(12) United States Patent
Homma

(10) Patent No.: US 12,058,401 B2
(45) Date of Patent: Aug. 6, 2024

(54) INFORMATION PROCESSING SYSTEM, INFORMATION PROCESSING METHOD, AND PROGRAM

(71) Applicant: SONY GROUP CORPORATION, Tokyo (JP)

(72) Inventor: Shunichi Homma, Saitama (JP)

(73) Assignee: SONY GROUP CORPORATION, Tokyo (JP)

( * ) Notice: Subject to any disclaimer, the term of this patent is extended or adjusted under 35 U.S.C. 154(b) by 45 days.

(21) Appl. No.: 17/791,109

(22) PCT Filed: Feb. 4, 2021

(86) PCT No.: PCT/JP2021/004137
§ 371 (c)(1),
(2) Date: Jul. 6, 2022

(87) PCT Pub. No.: WO2021/161894
PCT Pub. Date: Aug. 19, 2021

(65) Prior Publication Data
US 2023/0037102 A1    Feb. 2, 2023

(30) Foreign Application Priority Data

Feb. 12, 2020    (JP) .................................. 2020-021121

(51) Int. Cl.
*H04N 21/431* (2011.01)
*H04N 21/442* (2011.01)

(52) U.S. Cl.
CPC ................... *H04N 21/4312* (2013.01); *H04N 21/44218* (2013.01)

(58) Field of Classification Search
CPC ..................... H04N 21/4312; H04N 21/44218
See application file for complete search history.

(56) References Cited

U.S. PATENT DOCUMENTS

| 2013/0013089 A1 | 1/2013 | Kawakami |
| 2013/0014139 A1* | 1/2013 | Kawakami .............. A63J 5/021 725/9 |
| 2017/0150218 A1* | 5/2017 | Oobuchi .............. H04N 21/442 |

FOREIGN PATENT DOCUMENTS

| CN | 108648217 A | 10/2018 |
| CN | 110249631 A | 9/2019 |
| CN | 110433491 A | 11/2019 |
| JP | 2006013978 A | 1/2006 |
| JP | 2009-211528 A | 9/2009 |
| JP | 2018094326 A | 6/2018 |
| JP | 6519468 B2 | 5/2019 |

(Continued)

*Primary Examiner* — Mulugeta Mengesha
(74) *Attorney, Agent, or Firm* — Paratus Law Group, PLLC

(57) ABSTRACT

An information processing system includes a controller. The controller acquires viewing state information together with viewer identification information from terminals of a plurality of viewers that are reproducing content in which a performance of a performer is imaged via a network in real time, the viewing state information indicating a line of sight or a position of each viewer in a coordinate system of a space where the viewer is present, the viewer identification information identifying the viewer. Further, the controller adds an effect to the content for each of the viewers on the basis of the acquired viewing state information.

12 Claims, 24 Drawing Sheets

(56) References Cited

FOREIGN PATENT DOCUMENTS

| | | |
|---|---|---|
| JP | 2019-126101 A | 7/2019 |
| JP | 2019-139673 A | 8/2019 |
| WO | WO-2019234879 A1 | 12/2019 |

* cited by examiner

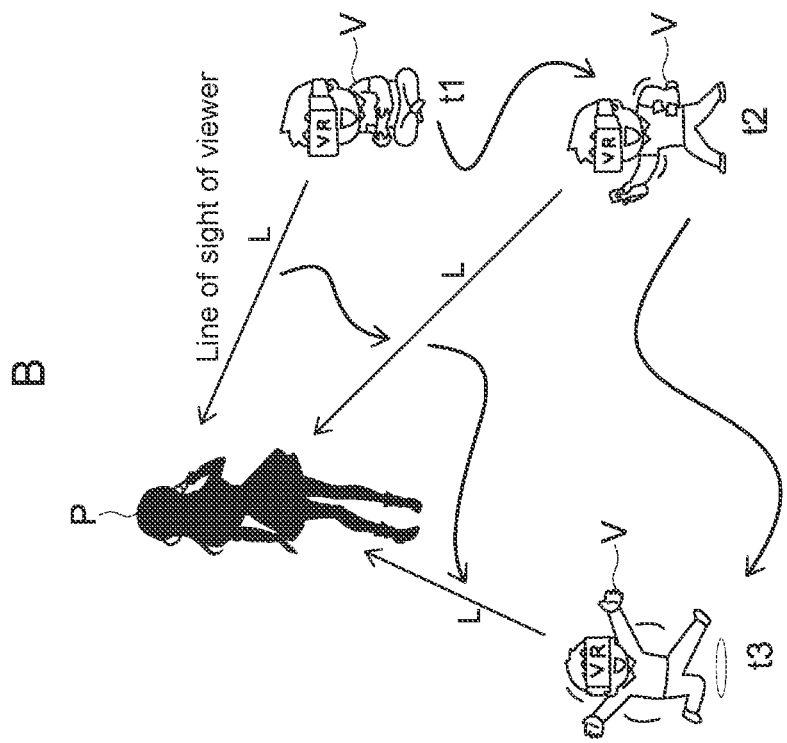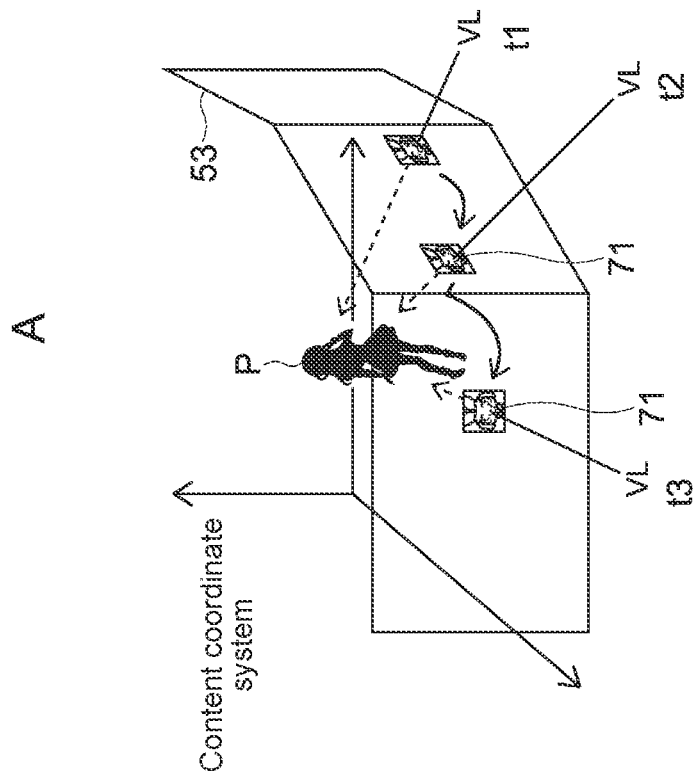
FIG.8

A Effect table

| Effect ID | Effect |
|---|---|
| 1000 | Display "comment in speech balloon: cute" around avatar image of input viewer |
| 1001 | Reproduce "sound effect: cute" from speaker near avatar image of input viewer |
| 1002 | |
| 1003 | Display "visual effect: star" around avatar image of input viewer |
| 1004 | Display "visual effect: rainbow" around avatar image of input viewer |

B1 Viewer 1 Action table

| Action ID | Action | Effect ID |
|---|---|---|
| 100 | Repeatedly move head up and down | 1000 |
| 101 | Repeatedly circularly move head | 1003 |
| 102 | Input button A of controller | 1001 |

B2 Viewer 2 Action table

| Action ID | Action | Effect ID |
|---|---|---|
| 100 | Perpendicularly shake controller | 1003 |
| 101 | Repeatedly move head up and down | 1000 |
| 102 | Repeatedly circularly move head | 2000 |

B3 Viewer 3 Action table

| Action ID | Action | Effect ID |
|---|---|---|
| 100 | Input button A of controller | 1000 |
| 101 | Continuously input button A of controller | 1004 |
| 102 | Continuously input button B of controller | 3000 |

FIG.12

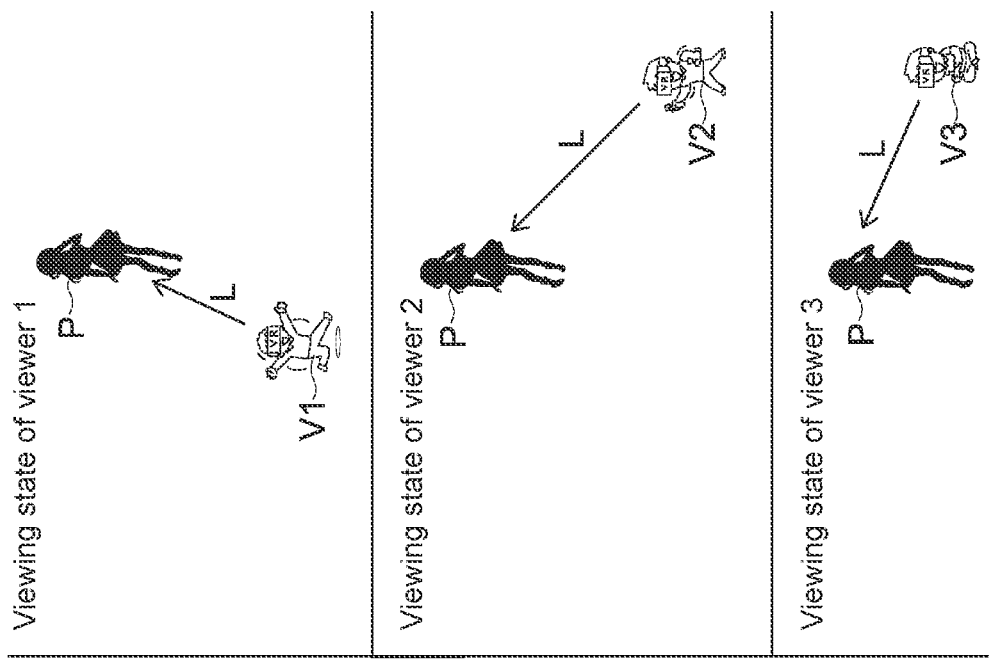
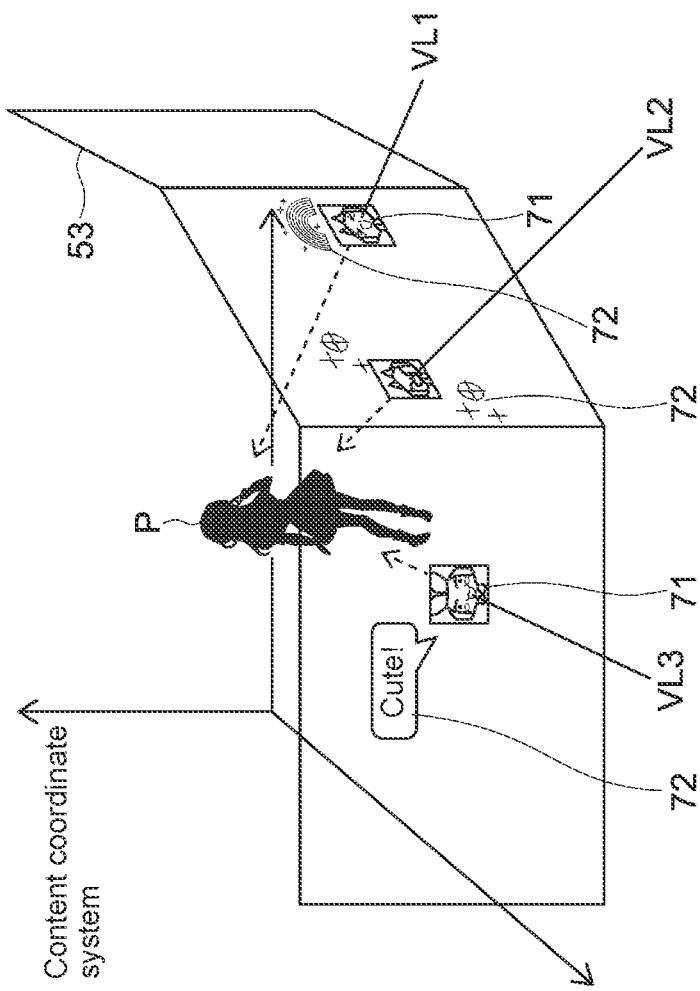
FIG.13

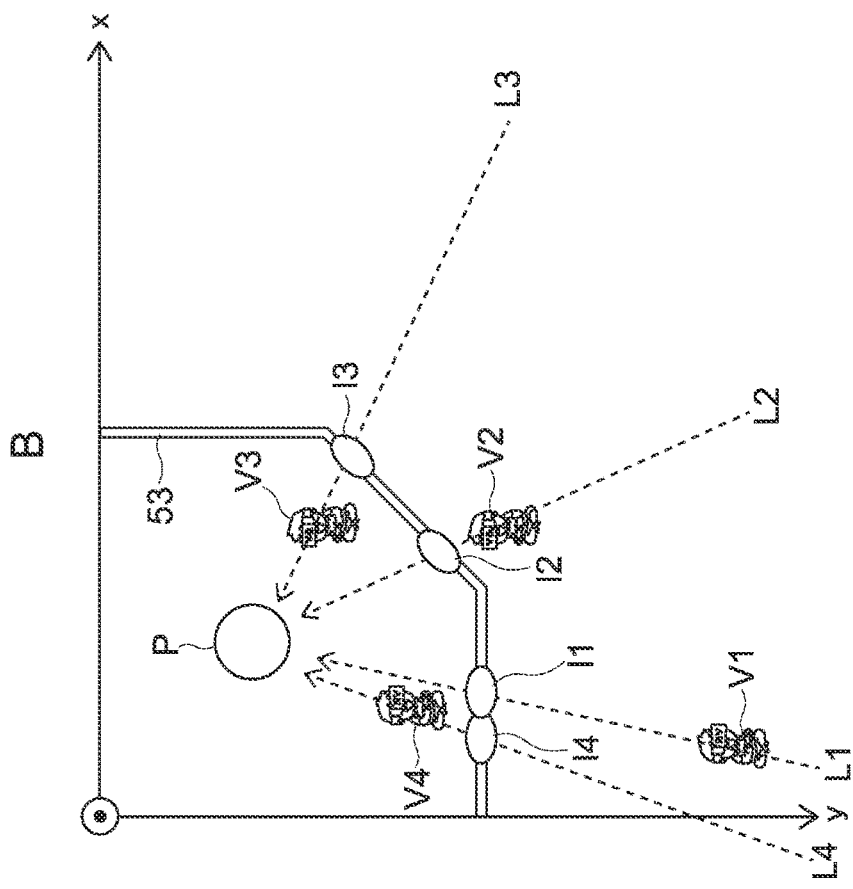
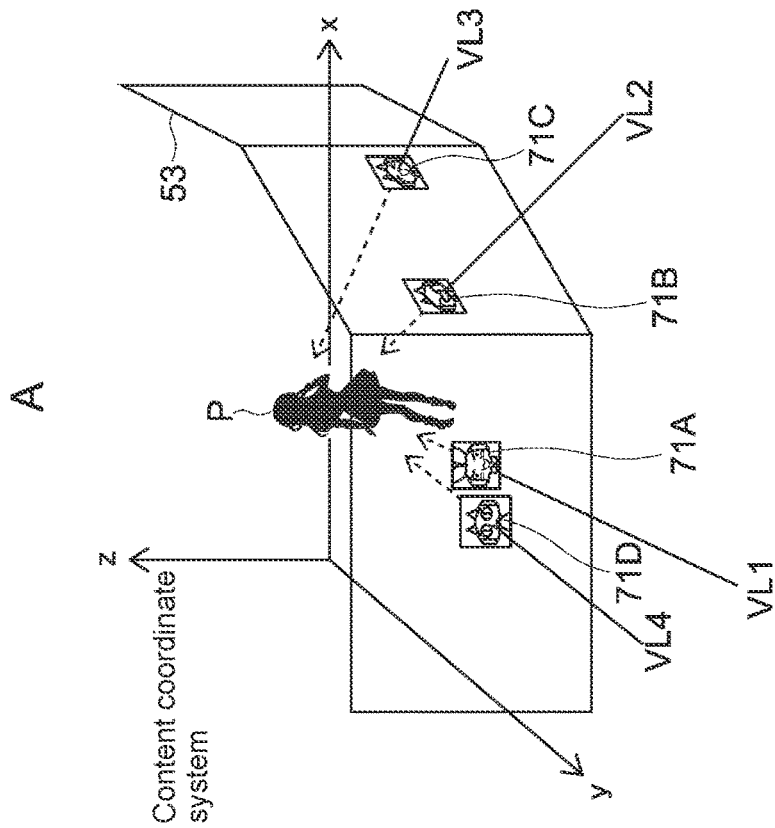
FIG.18

INFORMATION PROCESSING SYSTEM, INFORMATION PROCESSING METHOD, AND PROGRAM

CROSS REFERENCE TO PRIOR APPLICATION

This application is a National Stage Patent Application of PCT International Patent Application No. PCT/JP2021/004137 (filed on Feb. 4, 2021) under 35 U.S.C. § 371, which claims priority to Japanese Patent Application No. 2020-021121 (filed on Feb. 12, 2020), which are all hereby incorporated by reference in their entirety.

TECHNICAL FIELD

The present technology relates to an information processing system, an information processing method, and a program that are capable of presenting information about a viewer to a performer in a system for distributing content obtained by imaging performances of the performer to the viewer in real time via a network.

BACKGROUND ART

With the development of network technologies, content delivery services to remote locations continue to grow. For example, the moving image distribution including movie content has been implemented by a one-way system in which content data is distributed from a distributor to a viewer and the viewer enjoys the distributed content.

In recent years, for example, in real-time moving image distribution services, an interactive system in which a distributor and a viewer can communicate with each other has been implemented. This system offers a new value of experiencing communication through content as well as the content itself.

In such a system, the communication means for transmitting messages from the viewer to the distributor is mainly character information or sound information. In particular, for the character information, the character information input by the viewer is superimposed on a distributed moving image, so that communication between viewers as well as between the distributor and the viewer is implemented.

As the means for implementing communication through a network, for example, Patent Literature 1 below discloses means for a plurality of users to perform equal text-based communication in the same virtual space.

Further, Patent Literature 2 below discloses means for users using the same content to grasp their states with each other.

CITATION LIST

Patent Literature

Patent Literature 1: Japanese Patent Application Laid-open No. 2009-211528
Patent Literature 2: Japanese Patent No. 6519468

DISCLOSURE OF INVENTION

Technical Problem

In the conventional technologies, text information and sound information have been mainly used as means for communicating between a distributor and a viewer. However, there is a great deal of discrepancy as an experience between the communications performed over the network and the communications that have been performed until now at a physically close distance (the distance in which the other party can see).

For example, suppose a service in which a distributor acquires images and sound data of a performer in real time, converts those data into content data for distribution, and distributes the data to a movie theater or each home via a network, for the purpose of giving customers at remote locations an experience in a live music concert held in a limited place. In this case, the content is distributed to a movie theater as content displayed on the screen, and distributed to each home as content that can be viewed on a TV or as content that can be viewed on a head mount display (HMD).

In a venue where a music live concert is actually held, a performer can appropriately determine the next actions while confirming how much audience is present, where the audience is, how physically the audience is distributed, how the audience reacts to the acting, staging style, and performance of the performer, and the like. In addition, in the audience's position, since the performer determines the next actions while watching the audience's positions and reactions, the audience can experience communications other than listening to music, such as having the performer's line of sight in the audience's direction, enjoying a staging style, so-called "call-and-response" in which the audience answer the performer's call and the performer answer it, and feeling the reaction of other audience.

On the other hand, those communication experiences are difficult to reproduce using the conventional communication means using text or sound via a network. For that reason, even for the audience in the same live music concert, there is a large gap between the experience obtained at the actual venue and the experience obtained at a remote location via a network.

There is also a system in which a viewer can add an effect to content distributed via a network. Since the appearance of such an effect is the same for any viewer, the viewer cannot obtain a great sense of realism from the content.

In particular, in content that each viewer can view from a virtual line of sight (position), such as virtual reality (VR) content, if the appearance of the effect is uniform, this results in a lack of the sense of realism.

In view of the above circumstances, it is an object of the present technology to provide an information processing system, an information processing method, and a program that are capable of adding an effect corresponding to the line of sight or position of a viewer at a remote location to content distributed in real time.

Solution to Problem

In order to achieve the above object, an information processing system according to an embodiment of the present technology includes a controller. The controller acquires viewing state information together with viewer identification information from terminals of a plurality of viewers that are reproducing content in which a performance of a performer is imaged via a network in real time, the viewing state information indicating a line of sight or a position of each viewer in a coordinate system of a space where the viewer is present, the viewer identification information identifying the viewer. Further, the controller adds an effect to the content for each of the viewers on the basis of the acquired viewing state information.

As a result, the information processing system can add an effect corresponding to the line of sight or position of a viewer at a remote location to content distributed in real time. Here, the effect includes everything, e.g., a staging style including colors or light, an avatar image, and the like.

The controller may acquire attribute information indicating an attribute of the viewer together with the viewing state information and may change the effect in accordance with the attribute information.

The controller may calculate, when the effect is added to a first viewer of the plurality of viewers, coordinates of an intersection between a virtual plane set in the coordinate system of the space and the line of sight of a second viewer different from the first viewer, and may add the effect at a position corresponding to the coordinates of the intersection in the content.

The controller may set the virtual plane behind a viewing position of the first viewer in the coordinate system of the space.

As a result, the information processing system can add an effect expressing the viewing state of another viewer to the content without hindering the viewing by the viewer.

The controller may set a lower resolution for each effect corresponding to the second viewer as the number of the second viewers increases.

As a result, the information processing system can prevent the processing load for adding the effect from increasing due to the increase in the number of other viewers who are viewing the content, and the quality of the content itself from deteriorating.

The controller may change, if the coordinates of the intersection with the line of sight of the second viewer are outside of a viewing cone in the coordinate system of the first viewer, an adding position of the effect within the viewing cone.

As a result, the information processing system allows the viewer to constantly browse the effect added by another viewer regardless of the line-of-sight position of the other viewer.

The controller may add the effect for each of the plurality of viewers at a position corresponding to coordinates of an intersection distant from each viewer in two intersections between a region set to be centered at a position of the performer in the coordinate system of the space where the performer is present and the line of sight of each of the plurality of viewers.

As a result, the information processing system can add an effect to each viewer and reproduce the content so as not to hinder the viewing of each viewer who is paying attention to the performer in the content.

The controller may add the effect in response to an effect adding request including effect identification information indicating an attribute of the effect, the effect adding request being received from the terminal of each viewer, and when the attribute indicated by the effect identification information is a planar effect, may set a predetermined plane for each viewer behind the performer in the coordinate system of the space where the performer is present and on the line of sight of each viewer, and may add the effect on the predetermined plane.

As a result, the information processing system can reproduce an effect having a specific attribute in a form suitable for each viewer.

The controller may add the effect in response to an effect adding request received from the terminal of each viewer, and when the effect is added to a first viewer of the plurality of viewers, may add the effect only in response to an effect adding request from a second viewer having a line of sight or a position within a predetermined distance of the line of sight or a position of the first viewer, among the effect adding requests of the plurality of viewers.

As a result, the information processing system can prevent delays in content distribution and an increase in communication data due to an increase in the amount of processing by filtering only effects close to the viewer rather than adding effects in response to all effect adding requests.

The controller may acquire information indicating the number of terminals of the viewers, the terminals being reproducing the content, and may increase effectiveness of the added effect in accordance with the number.

As a result, the information processing system can allow the viewer to grasp the scale of other viewers who are viewing at the same time by the effectiveness of the effect. Here, the effectiveness of the effect is, for example, the number of rays in the case of an effect of rays, or the brightness of light in the case of an effect of light, but the present technology is not limited thereto.

An information processing method according to another embodiment of the present technology includes: acquiring viewing state information together with viewer identification information from terminals of a plurality of viewers that are reproducing content in which a performance of a performer is imaged via a network in real time, the viewing state information indicating a line of sight or a position of each viewer in a coordinate system of a space where the viewer is present, the viewer identification information identifying the viewer; and adding an effect to the content for each of the viewers on the basis of the acquired viewing state information.

A program according to another embodiment of the present technology causes an information processing apparatus to execute the steps of: acquiring viewing state information together with viewer identification information from terminals of a plurality of viewers that are reproducing content in which a performance of a performer is imaged via a network in real time, the viewing state information indicating a line of sight or a position of each viewer in a coordinate system of a space where the viewer is present, the viewer identification information identifying the viewer; and adding an effect to the content for each of the viewers on the basis of the acquired viewing state information.

Advantageous Effects of Invention

As described above, according to the present technology, it is possible to add an effect corresponding to the line of sight or position of a viewer at a remote location to content distributed in real time. However, the effectiveness described above does not limit the present technology.

BRIEF DESCRIPTION OF DRAWINGS

FIG. 8 is a diagram showing a display example of the line-of-sight information corresponding to the movement of the viewer in the content distribution system.

FIG. 12 shows tables showing the relationship between effects that can be requested for the performer by the viewer and actions therefor in the content distribution system.

FIG. 13 is a diagram showing a display example of an effect from the viewer to the performer in the content distribution system.

FIG. 18 shows diagrams showing a case where a performer, a plurality of viewers, and a display have a certain positional relationship in the content distribution system.

MODE(S) FOR CARRYING OUT THE INVENTION

Hereinafter, embodiments according to the present technology will be described with reference to drawings.

[Overview of System]

Figure 1:
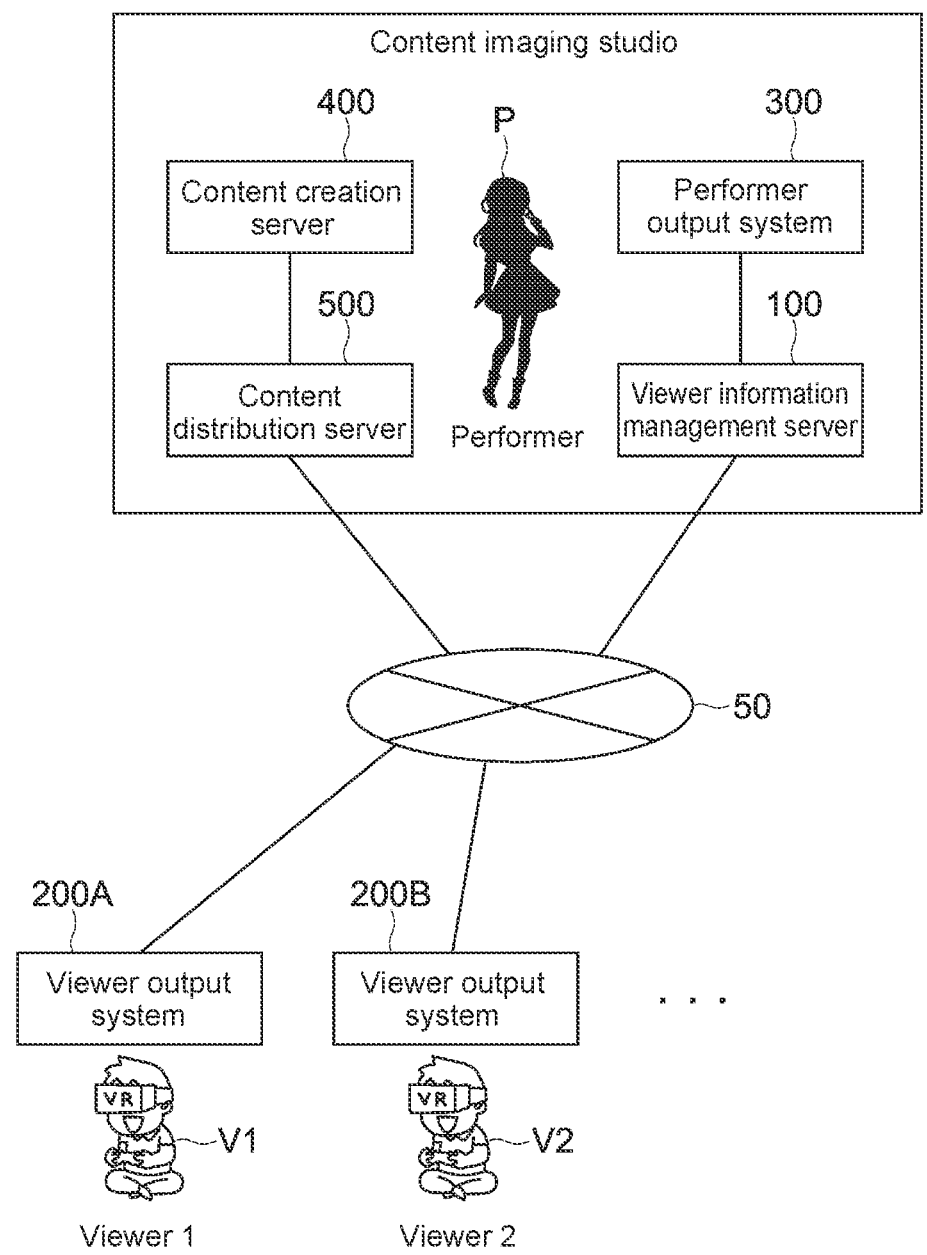
FIG. 1 is a diagram showing a configuration of a content distribution system according to an embodiment of the present technology.

FIG. 1 is a diagram showing a configuration of a content distribution system according to an embodiment of the present technology.

Figure 2:
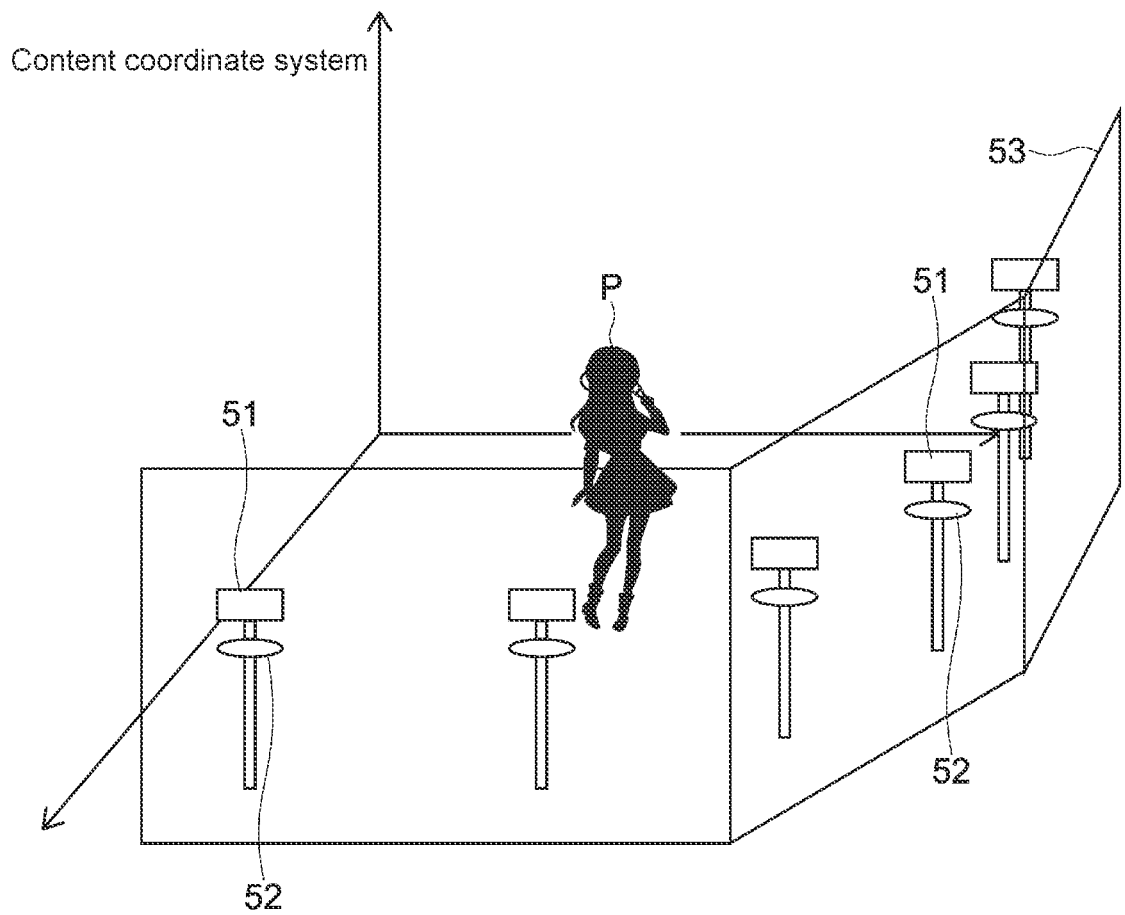
FIG. 2 is a diagram showing an equipment installation example in a studio of the content distribution system.

FIG. 1 is a diagram showing an overall configuration of the system, and FIG. 2 is a diagram showing an equipment installation example in a content imaging studio included in the system.

As shown in both figures, the present system includes a viewer information management server, a performer output system 300, a content creation server 400, and a content distribution server 500 in a content imaging studio, and a plurality of viewer output systems 200 connected to those above via a network 50 such as the Internet.

The content creation server 400 uses the above-mentioned studio exclusively for creating content to create content by imaging performances of performers in real time. The created content is streamed to viewers via the network 50.

The content distributed to viewers is virtual reality (VR) content configured on the basis of 3D models and surround sound. As shown in FIG. 2, the studio includes imaging equipment including one or more cameras 51 and microphones 52 for creating content, and the content creation server 400 creates distribution content on the basis of the imaged data.

The viewer information management server 100 appropriately acquires information relating to a viewing state of a viewer, such as the virtual line of sight or virtual position of the viewer, from the viewer output system 200 and manages the information.

The performer output system 300 includes one or more displays 53 for outputting the information relating to the viewing state of the viewer to a performer who appears in the content.

The viewer information management server 100 transmits information such as the viewing state of the viewer, which is received from the viewer output system 200, to the content creation server 400. The content creation server 400 can also change the distribution content according to the information.

The content created and changed by the content creation server 400 is distributed from the content distribution server 500 to each content viewer (viewer output system 200) by the content distribution server 500 via the network 50.

[Hardware Configuration of Viewer Information Management Server]

Figure 3:
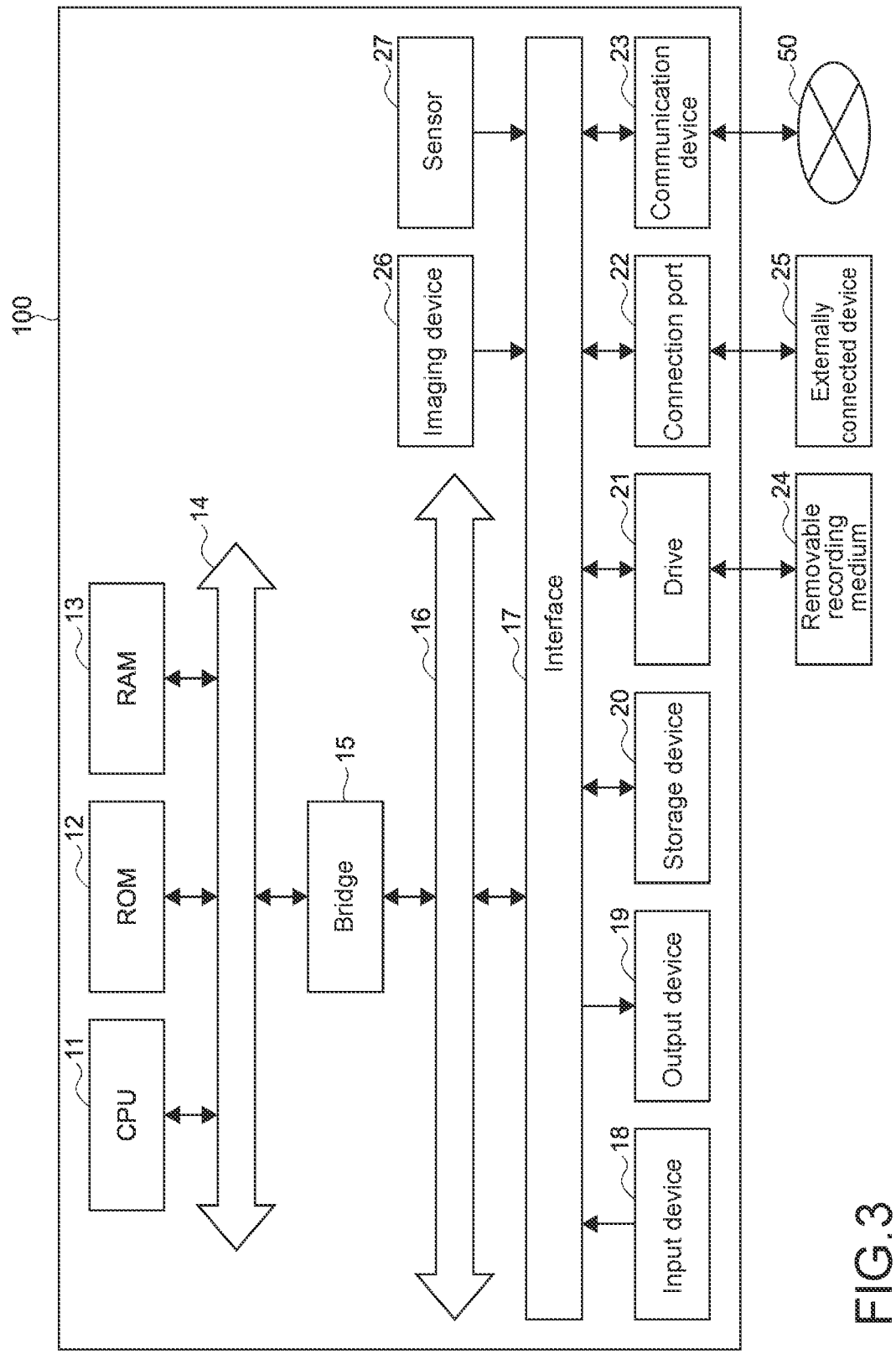
FIG. 3 is a diagram showing a hardware configuration of a viewer information management server included in the content distribution system.

FIG. 3 is a diagram showing a hardware configuration of the viewer information management server 100.

As shown in FIG. 3, the viewer information management server 100 includes a central processing unit (CPU) 11, a read only memory (ROM) 12, and a random access memory (RAM) 13. Further, the viewer information management server 100 may include a host bus 14, a bridge 15, an external bus 16, an interface 17, an input device 18, an output device 19, a storage device 20, a drive 21, a connection port 22, and a communication device 23. Furthermore, the viewer information management server 100 may include an imaging device 26 and a sensor 27 as necessary. The viewer information management server 100 may include a processing circuit such as a digital signal processor (DSP), an application specific integrated circuit (ASIC), or a field-programmable gate array (FPGA) in place of or in addition to the CPU 11.

The CPU 11 functions as an arithmetic processing unit and a control unit, and controls the entire operation of the viewer information management server 100 or a part of the operation in accordance with various programs recorded in the ROM 12, the RAM 13, the storage device 20, or on a removable recording medium 24. The ROM 12 stores programs, arithmetic parameters, and the like to be used by the CPU 11. The RAM 13 primarily stores programs to be used in the execution of the CPU 11, parameters that appropriately change in the execution, and the like. The CPU 11, the ROM 12, and the RAM 13 are connected to each other by the host bus 14 configured by an internal bus such as a CPU bus. Further, the host bus 14 is connected to the external bus 16 such as a viewer information management server I (Peripheral Component Interconnect/Interface) bus via the bridge 15.

The input device 18 is a device operated by a user, such as a touch panel, a physical button, a switch, and a lever. The input device 18 may be, for example, a remote control device using infrared rays or other radio waves, or may be an externally connected device 25 such as a smartphone or a smartwatch corresponding to the operation of the viewer information management server 100. The input device 18 includes an input control circuit that generates an input signal on the basis of the information input by the user and outputs the input signal to the CPU 11. The user operates the input device 18 to input various types of data to the viewer information management server 100 or instruct the viewer information management server 100 to perform a processing operation.

The output device 19 is constituted by a device capable of notifying the user of the acquired information using a sense of vision, a sense of hearing, a sense of touch, or the like. The output device 19 may be, for example, a display device such as a liquid crystal display (LCD) or an organic electroluminescence (EL) display, a sound output device such as a speaker, or the like. The output device 19 outputs the result obtained by the processing of the viewer information management server 100 as text or video such as images, sound or sound such as acoustics, or vibration, for example.

The storage device 20 is a device for storing data, which is configured as an example of a storage unit of the viewer information management server 100. The storage device 20 is constituted by, for example, a magnetic storage device such as a hard disk drive (HDD), a semiconductor storage device, an optical storage device, or a magneto-optical storage device. The storage device 20 stores, for example, programs to be executed by the CPU 11, various types of data, various types of data acquired from the outside, data acquired from the viewer output system 200 (line-of-sight parameters, avatar images of viewers, and the like to be described later), and the like.

The drive 21 is a reader/writer for the removable recording medium 24 such as a magnetic disk, an optical disc, a magneto-optical disk, or a semiconductor memory, and is built in or externally attached to the viewer information management server 100. The drive 21 reads information recorded on the mounted removable recording medium 24, and outputs the read information to the RAM 13. Further, the drive 21 writes a record to the mounted removable recording medium 24.

The connection port 22 is a port for connecting a device to the viewer information management server 100. The connection port 22 may be, for example, a universal serial bus (USB) port, an IEEE1394 port, or a small computer system interface (SCSI) port. Further, the connection port 22 may be an RS-232C port, an optical audio terminal, a high-definition multimedia interface (HDMI) port, or the like. The externally connected device 25 is connected to the connection port 22, so that various types of data can be exchanged between the viewer information management server 100 and the externally connected device 25.

The communication device 23 is, for example, a communication interface constituted by a communication device for connecting to the communication network 50. The communication device 23 may be, for example, a communication card for a local area network (LAN), Bluetooth (registered trademark), Wi-Fi, or wireless USB (WUSB). Further, the communication device 23 may be a router for optical communication, a router for asymmetric digital subscriber line (ADSL), or a modem for various communications. The communication device 23 transmits and receives signals or the like to and from, for example, the Internet or other communication devices using a predetermined protocol such as a TCP/IP. Further, the communication network 50 connected to the communication device 23 may also be a network connected with wires or wirelessly and includes, for example, the Internet, a home LAN, infrared communication, radio communication, or satellite communication.

The imaging device 26 is, for example, a camera for imaging a real space to generate a captured image by using an imaging element such as a complementary metal oxide semiconductor (CMOS) or a charge coupled device (CCD), and various members such as a lens for controlling the forming of a subject image to the imaging element. The imaging device 26 may be one that captures a still image, or may be one that captures a moving image.

Examples of the sensor 27 includes various sensors such as an acceleration sensor, an angular velocity sensor, a geomagnetic sensor, an illuminance sensor, a temperature sensor, an atmospheric pressure sensor, a depth sensor, and a sound sensor (microphone).

Each of the above-mentioned components may be configured using a general-purpose member, or may be configured by hardware specialized for the function of each component. Such a configuration may be appropriately changed depending on the level of technology at the time of implementation.

The viewer output system 200, the performer output system 300, the content creation server 400, and the content distribution server 500 also have hardware for functioning as a computer similar to that of the above-mentioned viewer information management server 100, although not shown in the figure.

[Operation of Content Distribution System]

Next, an operation of the content distribution system configured as described above will be described. The operation is performed in cooperation with the hardware such as the CPU 11 and a communication unit of the viewer information management server 100 and the software stored in the ROM 12, the RAM 13, the storage device 20, or the removable recording medium 24.

Figure 4:
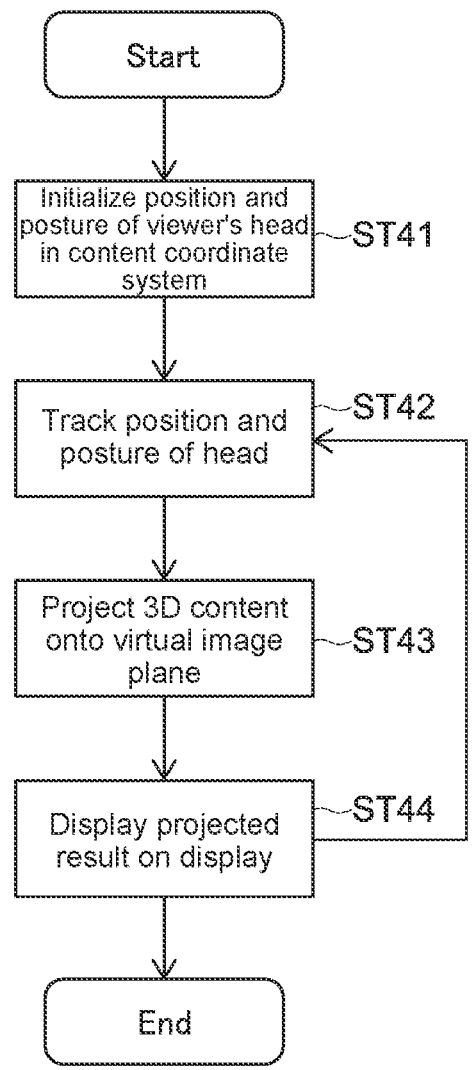
FIG. 4 is a flowchart showing a flow of content distribution processing by the content distribution system.
Figure 5:
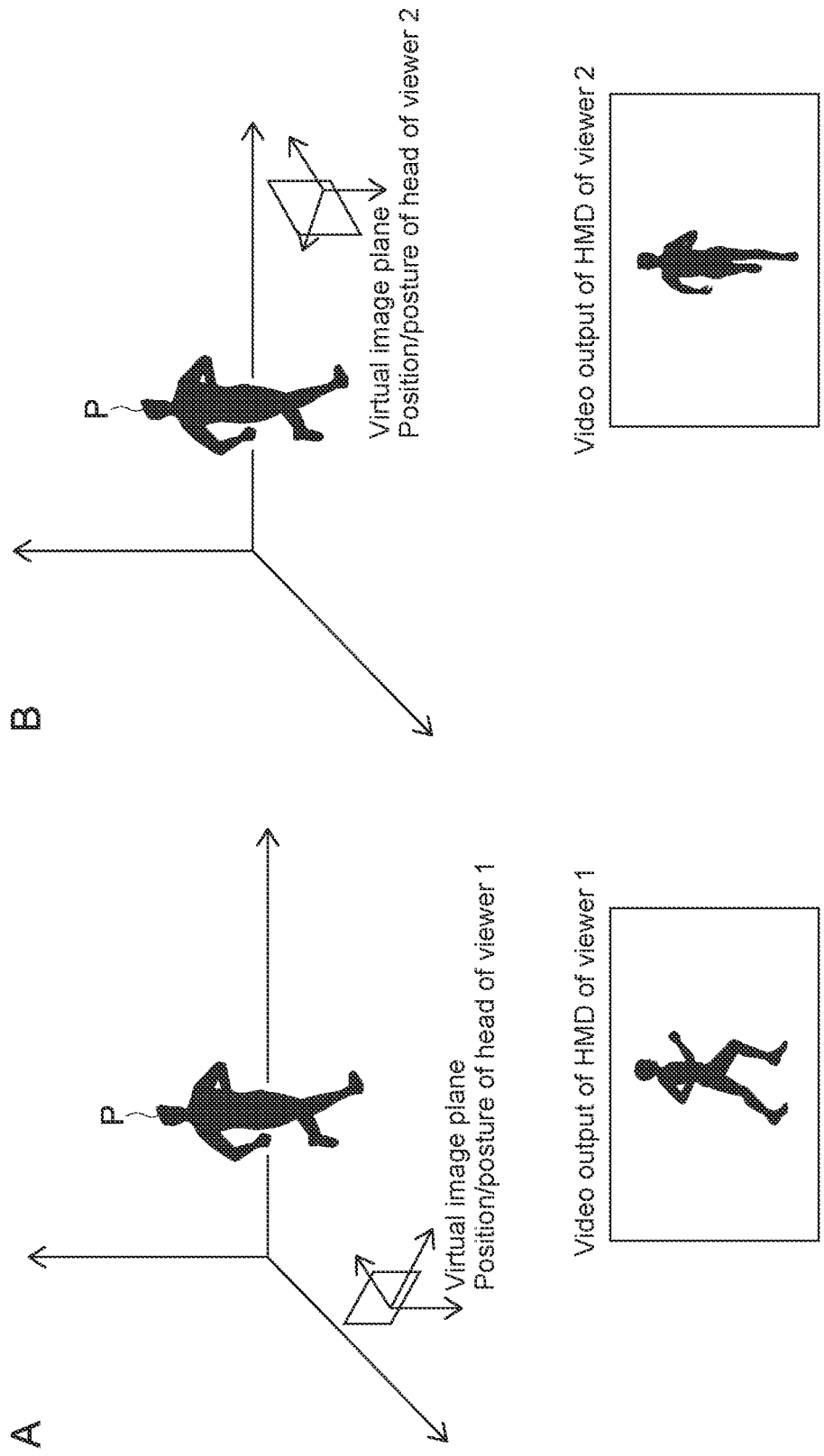
FIG. 5 is a diagram showing a display example when there are viewers having different positions and postures with respect to the content in the content distribution system.

FIG. 4 is a diagram showing a flowchart of display processing for the content distributed to the viewer output system 200. Further, FIG. 5 is a diagram showing a display example of the content when there are viewers having different positions and postures with respect to the content.

A content viewer receives the content and views the content through the viewer output system of each viewer. Here, the viewer output system 200 is, for example, a head-mounted display having a head tracking function capable of estimating the position and posture of the head of the viewer.

As shown in FIG. 4, the viewer output system 200 initializes the position and posture of the viewer's head in the coordinate system of the content (the coordinate system in the space in which the performer exists) (Step 41), and estimates the position and posture of the viewer's head in the content coordinate system by the head tracking function (Step 42).

Subsequently, the viewer output system 200 projects 3D content distributed according to the position and posture onto a virtual image plane (Step 43), and outputs the projected content to the display (Step 44).

As a technique for implementing the head tracking function, for example, a simultaneous localization and mapping (SLAM) technique using cameras and inertial measurement unit (IMU) sensors can be exemplified.

In general, binocular stereoscopic vision used for viewing VR content requires the positions and postures of the right and left eyes of the viewer, which can be calculated by using an offset from the estimated head position to both eyes.

As shown in FIG. 5, in the content coordinate system, a viewer 1 who is viewing the content from just beside (A of FIG. 5) and a viewer 2 who is viewing the content from the front (B of FIG. 5) have different ways of viewing the content in accordance with the position and posture of the head.

Instead of the viewer output system 200 estimating and using the actual position and posture of the viewer's head with or without the head tracking function, the viewer may virtually move the position and posture of the head with an input device such as a controller.

The content distribution system of this embodiment is capable of presenting, to the performer, virtual line-of-sight information of the viewer to the performer (including virtual position information of the viewer) and an effect indicating a reaction of the viewer during the content distribution processing. On the other hand, the content distribution system is capable of adding an effect indicating a reaction of the viewer to the content during the content distribution processing. Details of the above processing will be described below.

[Presentation of Viewer's Line-of-sight Information to Performer]

Figure 6:
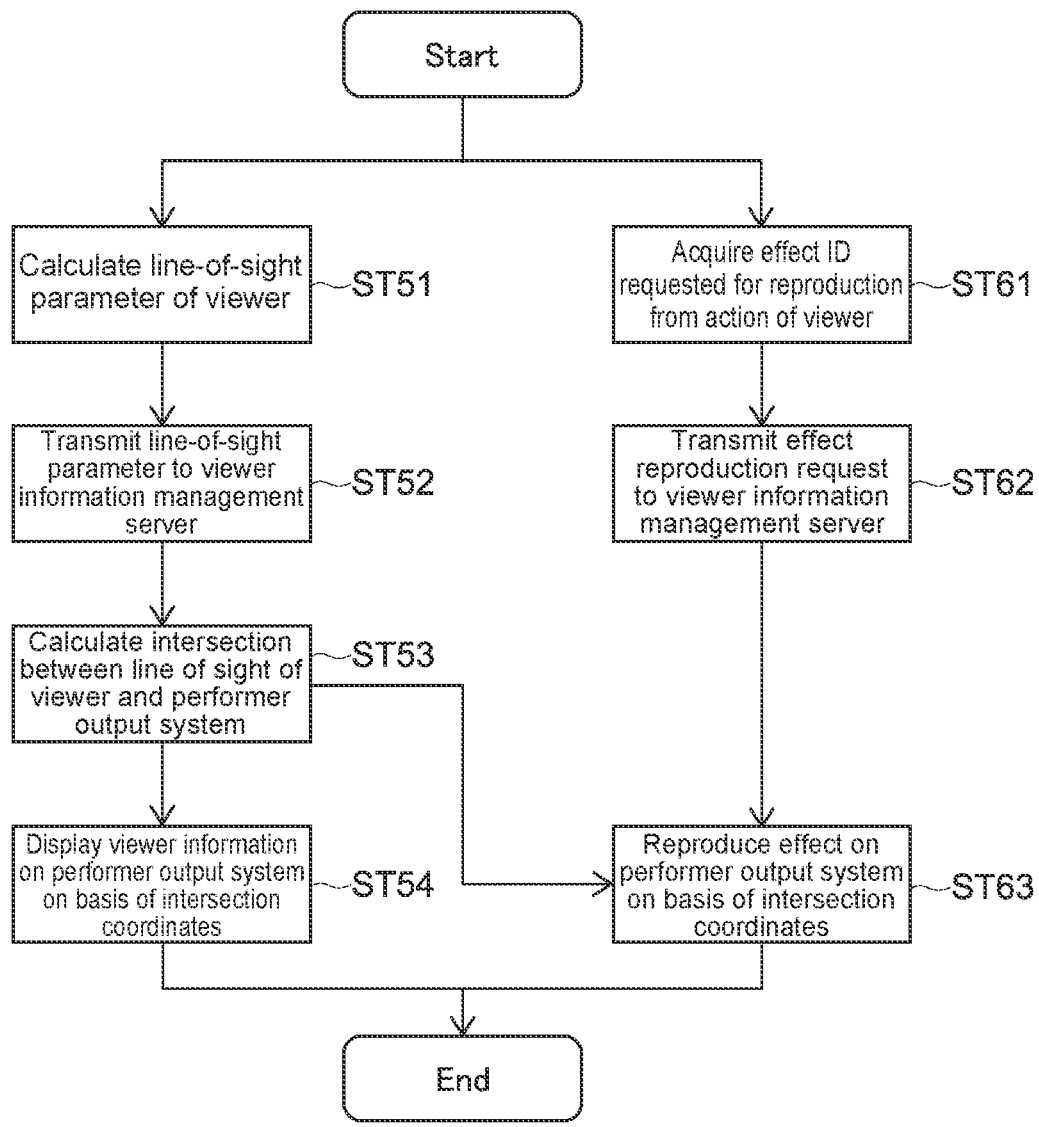
FIG. 6 is a flowchart showing a flow of viewer information display processing by the content distribution system.

FIG. 6 is a flowchart showing a flow of processing of presenting the viewer's line-of-sight information and an effect to the performer.

As shown in the flow on the left side of the figure, first, the viewer output system 200 calculates a line-of-sight parameter of the viewer in the content coordinate system (Step 51).

The viewer output system 200 may convert a line-of-sight parameter defined in advance in a head-mounted display coordinate system (the coordinate system in the space in which the viewer exists) into that of the content coordinate system to obtain the line-of-sight parameter, or if the viewer output system 200 has a device for estimating a line-of-sight direction of the viewer in real time, the viewer output system 200 may convert the parameter into that of the content coordinate system to obtain the line-of-sight parameter.

The line-of-sight parameter may be output separately for the right eye and the left eye, but here, it is considered that the line-of-sight parameter is limited to one parameter by some method such as adopting one of the right eye and the left eye or obtaining the average of the right and left eyes. Further, instead of using the positions of the viewer's eyes, the viewer output system 200 may use, on the assumption that the viewer always faces in the direction of the performer, a straight line connecting the position of the performer's head and the position of the viewer's head as the line-of-sight parameter, for example. Further, the viewer output system 200 may determine the line-of-sight parameter by setting a specific direction in the device coordinate system of the head-mounted display as the line-of-sight direction.

The line-of-sight parameter in the content coordinate system may be calculated not by the viewer output system 200 but by the viewer information management server 100 on the studio side. In this case, the viewer output system 200 transmits the viewer's line-of-sight parameter in the head mounted display coordinate system to the viewer information management server 100, and the viewer information management server 100 converts the line-of-sight parameter into a line-of-sight parameter in the content coordinate system.

Next, the viewer output system 200 transmits the viewer's line-of-sight parameter expressed in the content coordinate system to the viewer information management server 100 (Step 52).

The viewer information management server 100 performs the processing required by the performer output system 300 on the line-of-sight parameter transmitted from each viewer.

For example, when outputting an avatar image of a viewer as line-of-sight information in the performer output system 300, the viewer information management server 100 may perform processing of linking the line-of-sight parameter and the avatar image of the viewer who has transmitted the information.

The viewer information management server 100 (CPU 11) has the position and posture information, in the content coordinate system, of the display 53 installed in the studio and calculates the intersection coordinates of the display 53 and the viewer's line of sight on the basis of the viewer's line-of-sight parameter expressed in the content coordinate system (Step 53).

For example, when the performer output system 300 includes a plurality of displays 53, the viewer information management server 100 can calculate the intersection coordinates of the display 53 and the line of sight if expressing each display 53 by a plane equation and expressing the viewer's line of sight parameter by a straight-line equation.

This can also be applied to the case where the display 53 is a curved surface. Alternatively, the viewer information management server 100 may obtain the intersection coordinates in each display coordinate system after converting the line-of-sight parameter into that of each display coordinate system.

Subsequently, the viewer information management server 100 (CPU 11) causes the performer output system 300 to output the viewer's line-of-sight information to the display 53 in a form recognizable by the performer on the basis of the calculated intersection coordinates (Step 54).

Figure 7:
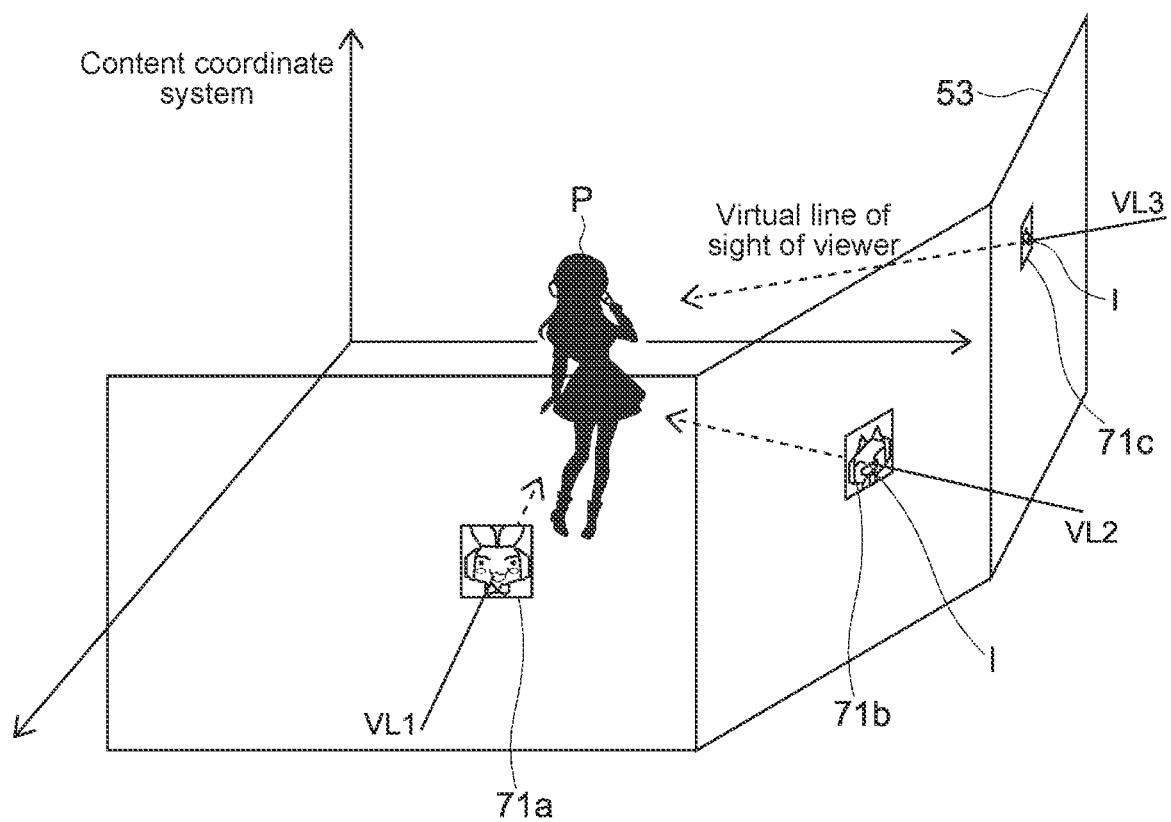
FIG. 7 is a diagram showing a presentation example of line-of-sight information of viewers to a performer in the content distribution system.

This can be implemented by converting the intersection coordinates I expressed in the content coordinate system into those of the display coordinate system and displaying an avatar image 71 of each viewer at a corresponding position, for example, as shown in FIG. 7. In the example of the figure, at the intersection coordinates I of a virtual line of sight VL1 of the viewer 1, a virtual line of sight VL2 of the viewer 2, and a virtual line of sight VL3 of a viewer 3 and the display 53, avatar images 71a, 71b, and 71c respectively corresponding thereto are displayed.

As shown in FIG. 8, by viewing the avatar image 71 displayed on the display 53, a performer P can recognize the line of sight of the viewer V at a remote location and the direction in which the viewer V exists in real time, and can take appropriate actions such as directing the performer's line of sight there or giving performances toward that direction. The example of the figure shows that the viewer V moves the line of sight L from right to left in time series of t1, t2, and t3 as shown in B of FIG. 8, the virtual line of sight VL also moves accordingly as shown in A of FIG. 8, and the avatar image 71 also moves accordingly.

Further, this allows the viewer V to have a communication experience as if the performer P and the viewer V are physically close to each other (e.g., the lines of sight are matched).

Modified Example Relating to Presentation of Line-of-Sight Information

Hereinafter, a modified example relating to the presentation of the viewer's line-of-sight information to the performer will be described.

As the number of viewers increases, the lines of sight of the viewers may concentrate on the same coordinates on the display 53 of the performer output system 300. At that time, if the avatar image 71 or the like set for each viewer is displayed, the plurality of avatar images 71 overlap with each other, and the visibility of the performer is lowered.

In such a case, the viewer information management server 100 may cause the performer output system 300 to replace the plurality of avatar images 71 for each of the viewers with other images or the like expressing the concentration of the lines of sight of the plurality of viewers and display them.

For example, if viewpoints of X or more persons are gathered in a region having a predetermined area or less on the display 53, the performer output system 300 may replace the group of avatar images 71 of the viewers with an image A and display it. When viewpoints of Y or more persons are gathered in the region described above, the performer output system 300 may replace the group of avatar images 71 with an image B different from the image A and display it. Further, instead of the avatar image 71, the performer output system 300 may display a heat map indicating the degree of concentration of the lines of sight on the display 53.

The viewer information management server 100 may change or process the avatar image 71 of the viewer displayed on the display of the performer output system 300 by using viewer attribute information managed by the viewer information management server 100 or viewer attribute information added to the line-of-sight parameter information acquired from the viewer output system 200.

For example, the viewer information management server 100 may provide a frame of a different color to the avatar image 71, change the size of the avatar image 71, or change the transparency in accordance with the viewer's age, gender, nationality, residence, viewing time, the number of times of viewing or purchasing of the content played by the same performer, the distance from the performer in the content coordinate system, or other parameters associated with the viewer.

The video output device of the performer output system 300 may be a device other than the display 53. For example, in the case of using a projector, the viewer information management server 100 can calculate the position where the viewer's avatar image 71 or the like is to be drawn in the same manner as in the case of using the display 53 by expressing the plane of a projection destination of the projector in the content coordinate system.

Figure 9:
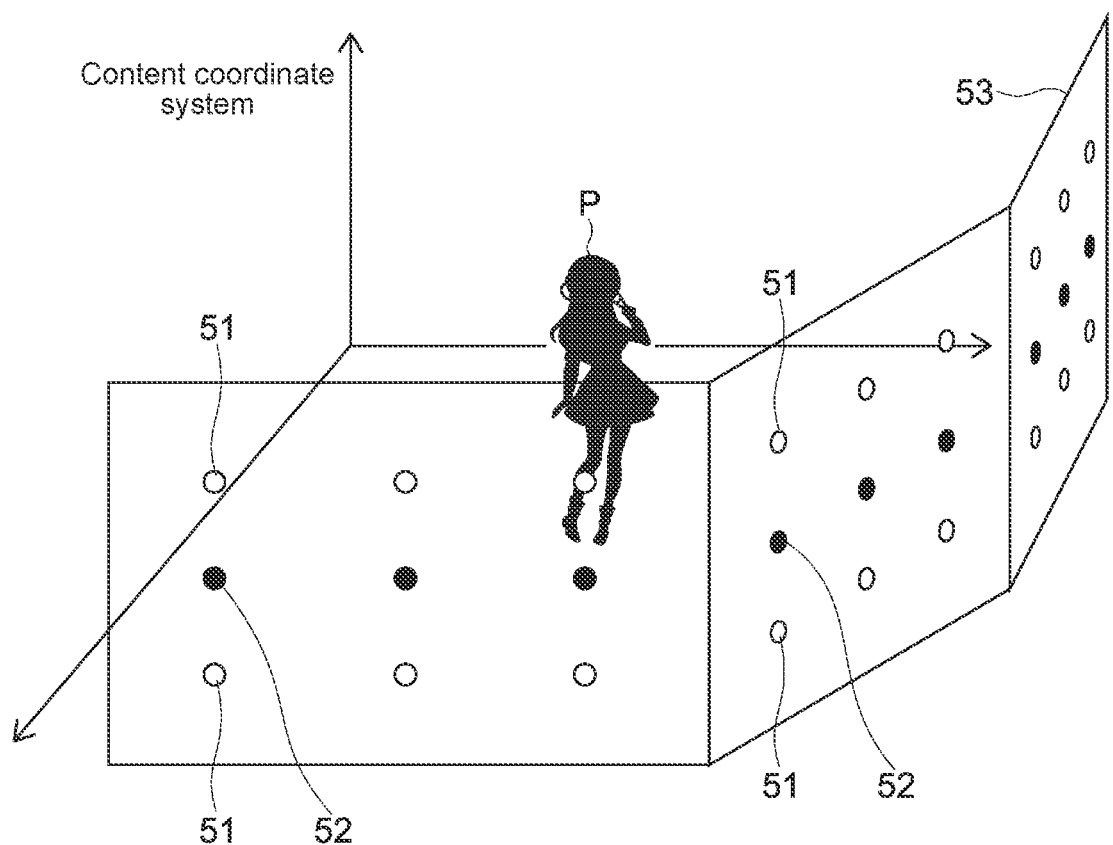
FIG. 9 is a diagram showing a modified example of the equipment installation example in the studio of the content distribution system.

Further, in order to improve the visibility of the display 51 to the performer, instead of the configuration shown in FIG. 2, a display device in which the plurality of cameras 51 and microphones 52 are embedded (for example, in a matrix) in the same plane as in the display 53 may be used as shown in FIG. 9.

Figure 10:
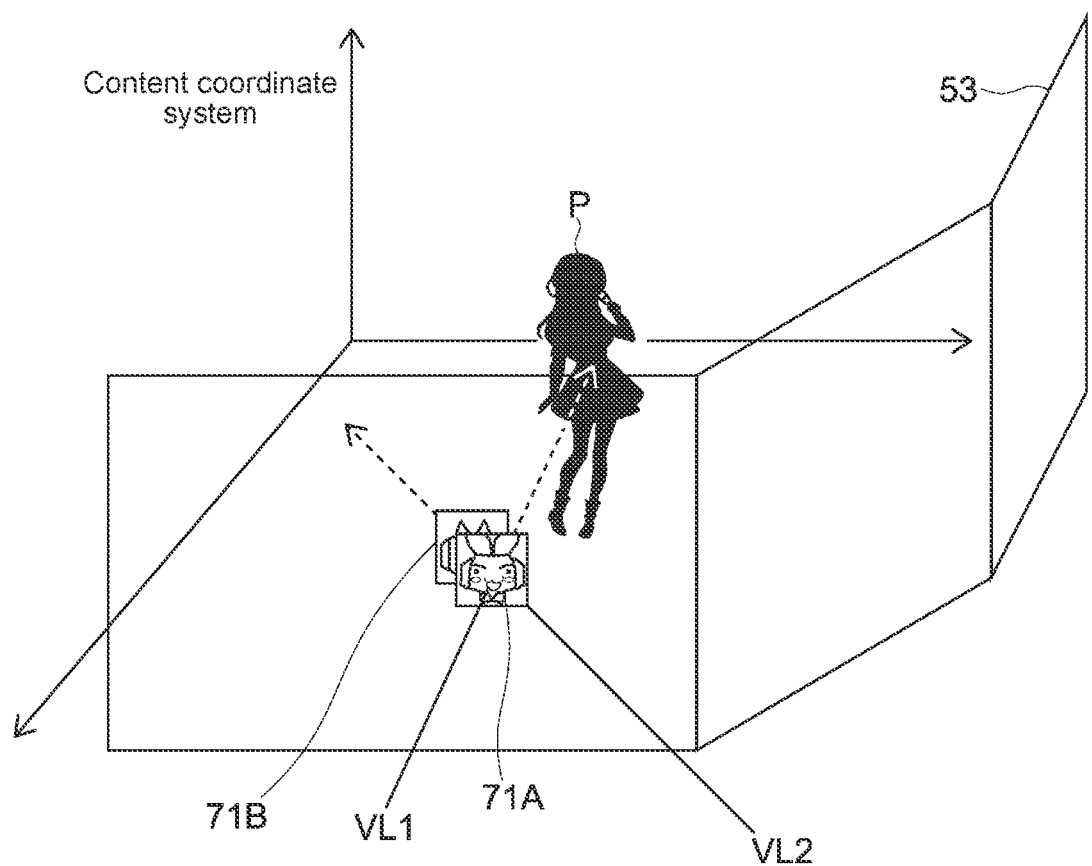
FIG. 10 is a diagram showing an example in which information of different viewers having different lines of sight is displayed at the same position in the content distribution system.

As shown in FIG. 10, it is also considered that, even if the information of different viewers, e.g., the avatar images 71, is displayed at the same position on the display 53 in the performer output system 300, a viewer does not look toward the performer (the line of sight VL1 is pointing toward the performer P, but the line of sight VL2 is not pointing toward the performer P).

Figure 11:
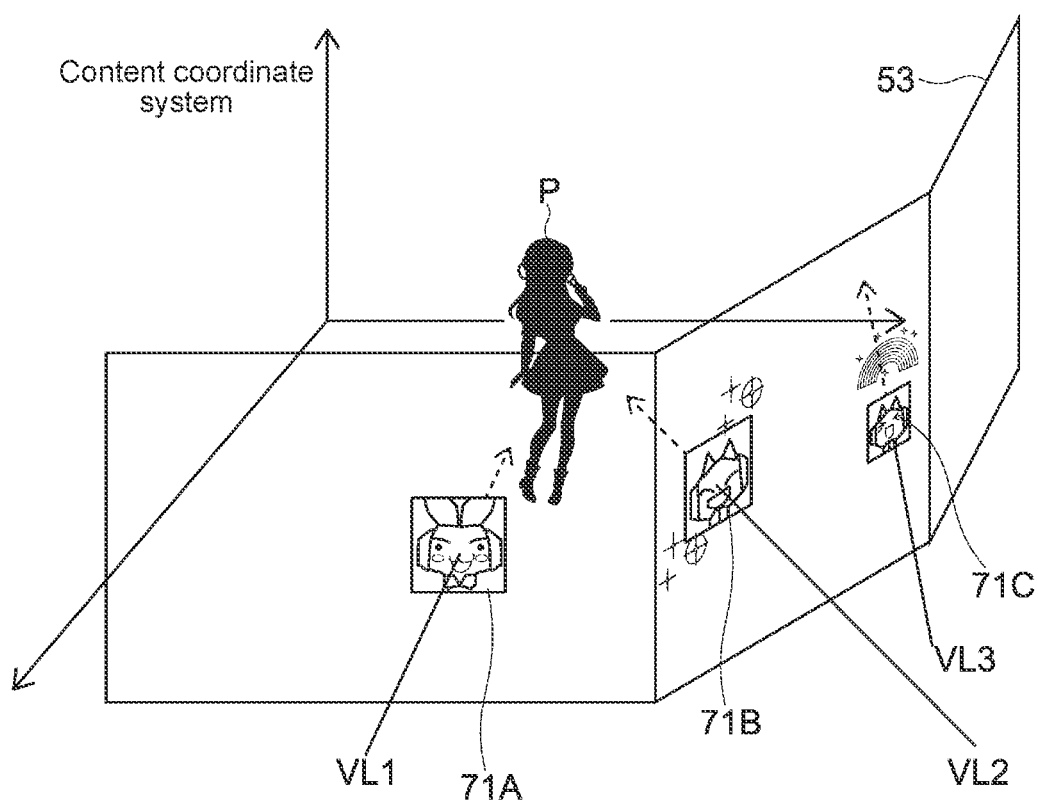
FIG. 11 is a diagram showing a display example of the line-of-sight information corresponding to whether the viewer's line of sight is directed toward the performer in the content distribution system.

In this case, in order to transmit more accurate line-of-sight information of the viewer V to the performer P, for example, as shown in FIG. 11, the viewer information management server 100 may change the size of the avatar image 71 or the color of the frame or may avoid displaying the avatar image 71 itself between the case where the line of sight of the viewer V is directed toward the performer P and the case where the line of sight of the viewer V is not directed toward the performer P in the content coordinate system.

In the example of the figure, since the virtual lines of sight VL1 and VL2 are directed toward the performer P, the avatar images 71A and 71B corresponding thereto are displayed in the normal size. However, since the virtual line of sight VL3 is not directed toward the performer P, the avatar image 71C corresponding thereto is displayed smaller than the avatar images 71A and 71B.

Whether or not the viewer's line of sight is directed toward the performer P can be determined, for example, by whether or not the performer is included in a viewing cone of any size centered on the viewer's line of sight.

The position of the viewer information (avatar image 71) displayed on the performer output system 300 may be updated at any intervals. If an intersection position c(t) of the line of sight of a certain viewer and the display differs from an intersection position c(t−1) for the same viewer that is calculated just before, the viewer information management server 100 may move the viewer information to move on the trajectory connecting the two intersections.

[Presentation of Effect of Viewer to Performer]

Next, description will be given on the means for transmitting information such as a reaction or excitation of the viewer to the performer by additionally displaying information other than the viewer's line of sight in the performer output system 300.

By obtaining such information, the performer can give an appropriate performance to the viewer. A content distributor creates effects that can be requested for reproduction by the viewer to the performer output system, as in the effect table shown in A of FIG. 12. The effect table is a table in which an effect ID for identifying an effect is associated with the content of an effect indicated by the effect ID. The effect table is stored in, for example, the storage device 20 of the viewer information management server 100.

Each viewer registers an action for issuing a reproduction request of each effect in accordance with the viewer's own input device, as shown in viewer action tables of B1 to B3 of FIG. 12. Here, the action means an input of a specific command or movement to a device included in the viewer output system 200.

As shown in the flow on the right side of FIG. 6, first, the viewer output system 200 acquires the effect ID of the effect to be requested for reproduction from the action of the viewer (Step 61).

For example, the viewer 1 in B of FIG. 12 repeatedly moves the head up and down, thereby issuing a request to reproduce an effect in the performer output system 300 with respect to the effect having the effect ID of 1000. Viewers having viewing environments with the head tracking function may use the movement of the head as a request, like the viewer 1 in B of FIG. 12, or viewers using motion controllers may use a particular motion as a request, like the viewer 2.

Subsequently, the viewer output system 200 transmits an effect reproduction request corresponding to the effect ID to the viewer information management server 100 (Step 62).

The effect reproduction request of each viewer is transmitted to the viewer information management server 100 as data in which the viewer ID for identifying the viewer and the effect ID are associated with each other.

The viewer information management server 100 (CPU 11) then reproduces an effect corresponding to the effect ID at a position (for example, in the vicinity of the avatar image 71) corresponding to the intersection coordinates of the performer output system 300 on the basis of the intersection coordinates (Step 63).

For example, as shown in FIG. 13, in response to a reproduction request from the viewer 1, a visual effect 72 having the effect ID of 1004 (rainbow) shown in A of FIG. 12 is reproduced. In response to a reproduction request from the viewer 2, a visual effect 72 having the effect ID of 1003 (star) shown in A of FIG. 12 is reproduced, and in response to a reproduction request from the viewer 3, a visual effect 72 having the effect ID of 1000 (comment in speech balloon, "cute") shown in A of FIG. 12 is reproduced.

Modified Example of Effect Presentation Processing for Performer

Hereinafter, a modified example of the effect presentation processing for the performer will be described.

Similar to the above-mentioned line-of-sight information, if the number of viewers increases, the effect reproduction requests may be concentrated in the vicinity of the same coordinates on the display 51 of the performer output system 300. At that time, if the effects requested for each of the viewers are reproduced, the visibility of the performer is lowered due to the overlapping of the plurality of effects.

In such a case, the viewer information management server 100 may cause the performer output system 300 to replace the effects of the plurality of viewers with another effect such as expressing the concentration of the plurality of effect reproduction requests and reproduce it.

For example, when the same effect reproduction request is received from X or more persons in a predetermined region on the display 53, the performer output system 300 may replace the effects of the respective viewers with a special effect expressing the concentration of the effects and reproduce it.

The viewer information management server 100 may use the viewer attribute information managed by the viewer information management server 100 or the viewer attribute information added to the line-of-sight parameter information acquired from the viewer output system 200 to control the size of the effect reproduced by the performer output system 300 and the type of effect that can be requested.

For example, the viewer information management server 100 may control the type of effect that can be requested in accordance with the viewer's viewing time, the number of times of viewing or purchasing of the content played by the same performer, and other parameters associated with the viewer.

The viewer information management server 100 may reproduce an effect that does not depend on the line-of-sight position in order to express the overall excitation of the viewers.

For example, if the viewer information management server 100 receives the same effect reproduction request from a specific number of viewers or more at a specific timing, the viewer information management server 100 may cause the performer output system 300 to reproduce a special effect (e.g., a visual effect displayed over the entire display 53) indicating the reception of the same effect reproduction request.

The performer output system 300 may include a sound reproduction device such as a speaker. This allows the viewer to request sound effects as well as visual effects.

For example, by using a display device in which a plurality of speakers is embedded in the display 53 in the same manner as in FIG. 9, it is possible to reproduce a sound effect requested by a viewer from a speaker located in the vicinity of the avatar image 71 (intersection coordinates I) corresponding to the viewer who has issued the reproduction request of the sound effect.

[Addition of Effect to Content]

Next, description will be given on a method of notifying in real time what kind of reaction is being provided between viewers who are viewing the same distribution content by adding a specific effect to the distribution content in accordance with the actions of the viewers.

Similar to the effect presented to the performer, the content distributor creates an effect that can be requested to be added to the distribution content by the viewer. Similarly, each viewer registers an action for issuing a request for adding an effect in accordance with an input device of the viewer. A table relating to the effect (for example, in the same format as that shown in FIG. 12) is also stored in the storage device 20 of the viewer management server 100, for example.

Figure 15:
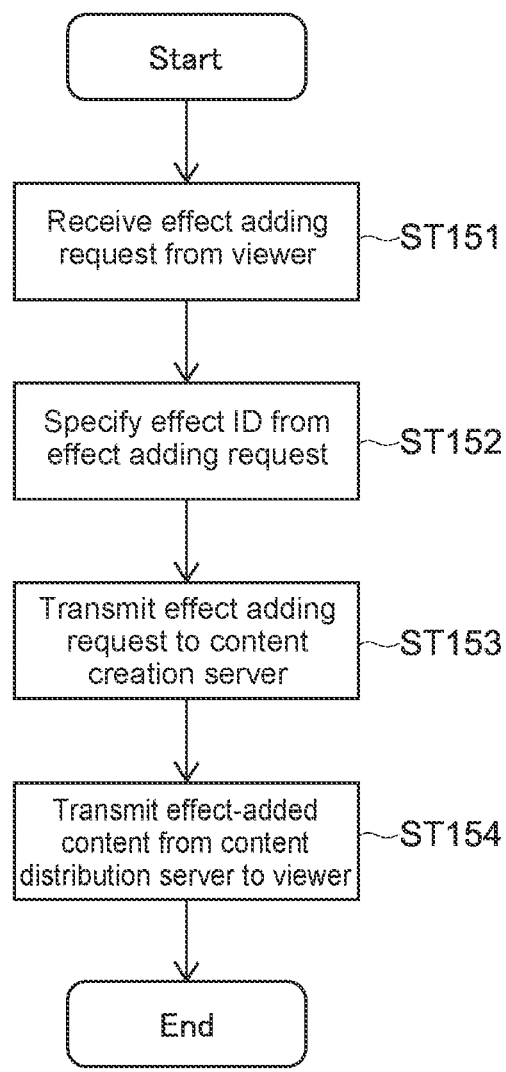
FIG. 15 is a flowchart showing a flow in which the content distribution system adds an effect to the content in response to a request from a viewer.
Figure 16:
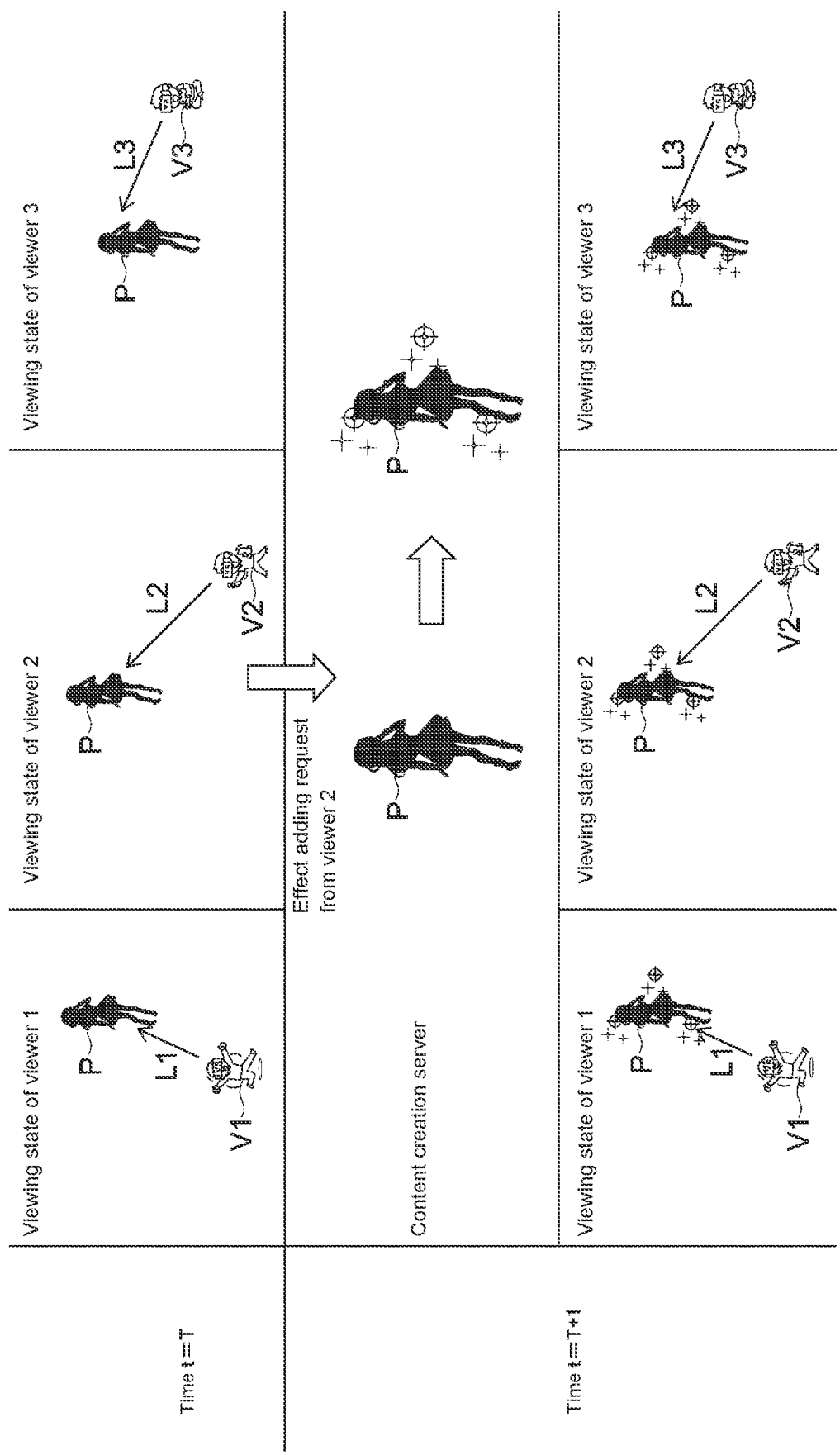
FIG. 16 is a conceptual diagram showing a flow in which the content distribution system adds an effect to the content in response to a request from a viewer.

FIG. 15 is a flowchart showing a flow until the VR content to which an effect is added is distributed to the viewer in response to an effect adding request of a certain viewer. Further, FIG. 16 is a conceptual diagram showing the flow.

As shown in FIG. 15, first, the CPU 11 of the viewer information management server 100 receives an effect adding request of each viewer from the viewer output system 200 of each viewer (Step 151). The effect adding request is received as data in which the viewer ID and the effect ID are associated with each other.

Subsequently, the CPU 11 specifies the effect ID from the effect adding request (Step 152).

Subsequently, the CPU 11 transmits the effect adding request including the effect ID to the content creation server 400 (Step 153).

The content to which the effect corresponding to the effect ID is added by the content creation server 400 is then distributed from the content distribution server 500 to the viewer output system 200 (Step 154).

The effect adding request may be directly transmitted to the content creation server 400 without passing through the viewer information management server 100.

As shown in FIG. 16, when a visual request to shine around the performer P is transmitted from the viewer 2 to the viewer information management server 100, for example, such an effect is added to the content by the content creation server 400, and the content is distributed to the viewer output system 200 of each viewer. Thus, the viewers can visually recognize the added effect from the different lines of sight L1, L2, and L3. In particular, the viewers 1 and 3 can know in real time how the viewer 2 is reacting to the content.

Modified Example Relating to Addition of Effect to Content

Hereinafter, a modified example of the processing of adding an effect to the content will be described.

The modification similar to that described in the effect presentation processing for the performer is possible.

In other words, similarly to the line-of-sight information and effect presented to the performer, if the number of viewers increases, the effect adding requests may be concentrated in the vicinity of the same position of the content (for example, around the performer). At that time, if the effects requested for each of the viewers are added, the plurality of effects overlap with each other, and the visibility of the viewer is lowered.

In such a case, the viewer information management server 100 may cause the content creation server 400 to replace the effects of the plurality of viewers with another effect expressing the concentration of the plurality of effect adding requests and add it.

For example, if the same effect adding request is received from X or more persons, the content creation server 400 may replace the effects of the respective viewers with a special effect expressing the concentration of the effects and add it.

The viewer information management server 100 may use the viewer attribute information managed by the viewer information management server 100 or the viewer attribute information added to the line-of-sight parameter information acquired from the viewer output system 200 to control the size of the effect added to the content or the type of effect that can be requested.

For example, the viewer information management server 100 may control the type of effect that can be requested to be added, in accordance with the viewer's viewing time, the number of times of viewing or purchasing of the content played by the same performer, and other parameters associated with the viewer.

Further, when the same effect adding request is received from a specific number of viewers or more at a specific timing, the content creation server 400 may also add a special effect indicating the effect adding request (e.g., visual effect displayed throughout the content).

The viewer information management server 100 may use the viewer attribute information managed by the viewer information management server 100 or the viewer attribute information added to the line-of-sight parameter information to change the VR content without the viewer's intentionally issuing a request.

Figure 17:
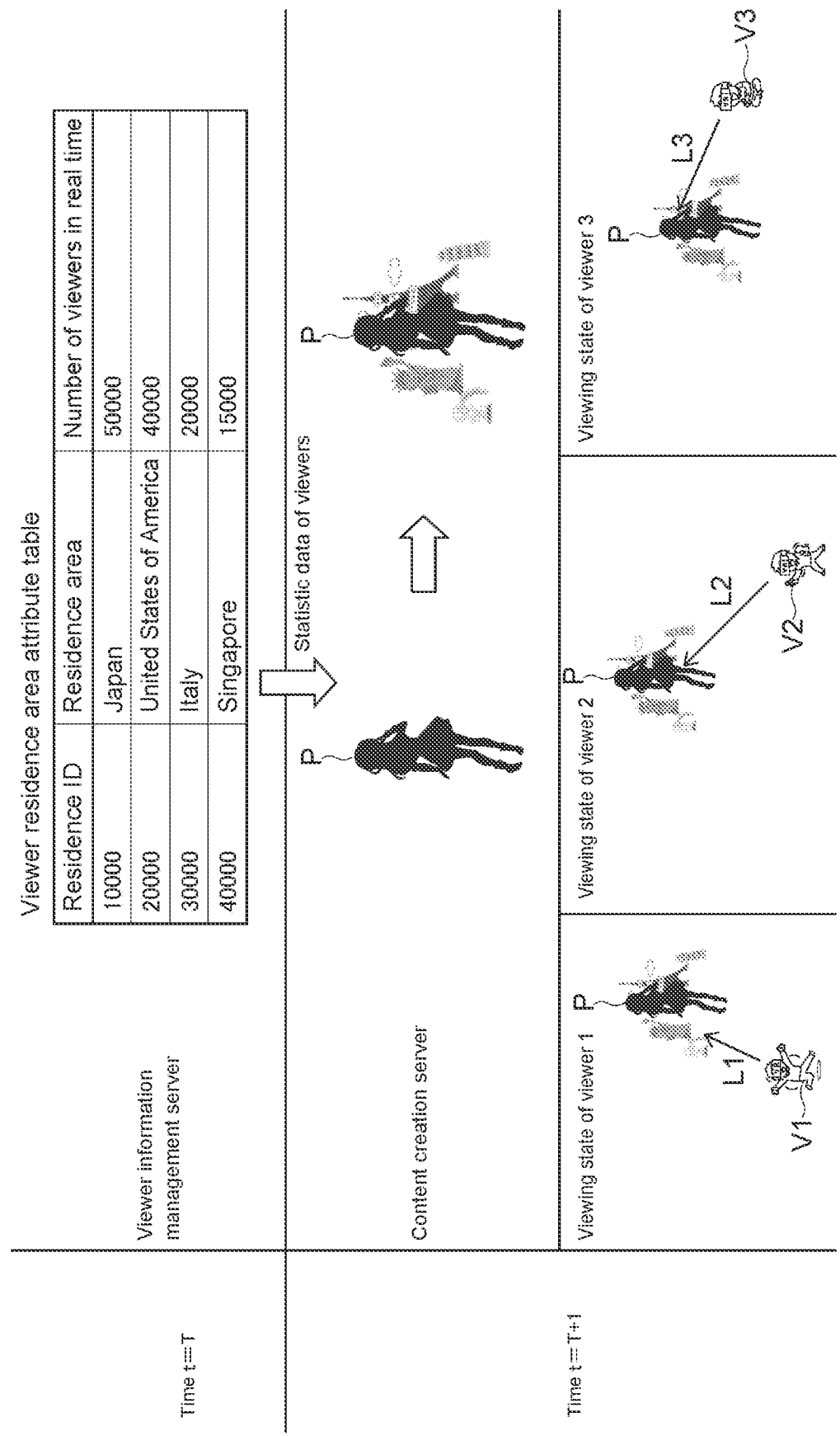
FIG. 17 is a diagram showing a modified example of the processing of adding an effect to the content in the content distribution system.

For example, as shown in FIG. 17, the viewer information management server 100 stores a viewer residence area attribute table indicating the number of viewers for each place of residence of viewers in various places around the world. Then, the content creation server 400 may create the content by changing the display sizes of 3D models such as landmarks representing various places (for example, in Japan, Tokyo Tower; in the United States of America, the Statue of Liberty; in Italy, the Tower of Pisa; and in Singapore, Merlion statue; etc.) according to the number of viewers in the place of residence, and synthesizing the display sizes with the background of the performer P.

In the example in the figure, since the number of viewers is large in the order of Japan, the U.S., Italy, and Singapore, the size of 3D model is set in the order of Tokyo Tower, the Statue of Liberty, the Tower of Pisa, and Merlion statue as the background of the content.

[Expansion Example Relating to Addition of Effect to Content]

By using the line-of-sight information and the position information of the viewer and the line-of-sight information and the position information of the performer, it is possible to share the viewing state between the viewers and to add an effect to the content more effectively. Several examples will be described below.

Sharing of Viewing State Between Viewers

As one of the methods of sharing the viewing state, a method of adding the viewing state of another viewer (e.g., the position of the viewer) to the distribution content and viewing the content is conceivable. At that time, if the viewing state of the other viewer is unconditionally added to the distribution content, there arises a problem that the additional content (effect) appears at a position where viewing of the distribution content is hindered or the distribution content is buried in the additional content and is not seen.

Figure 19:
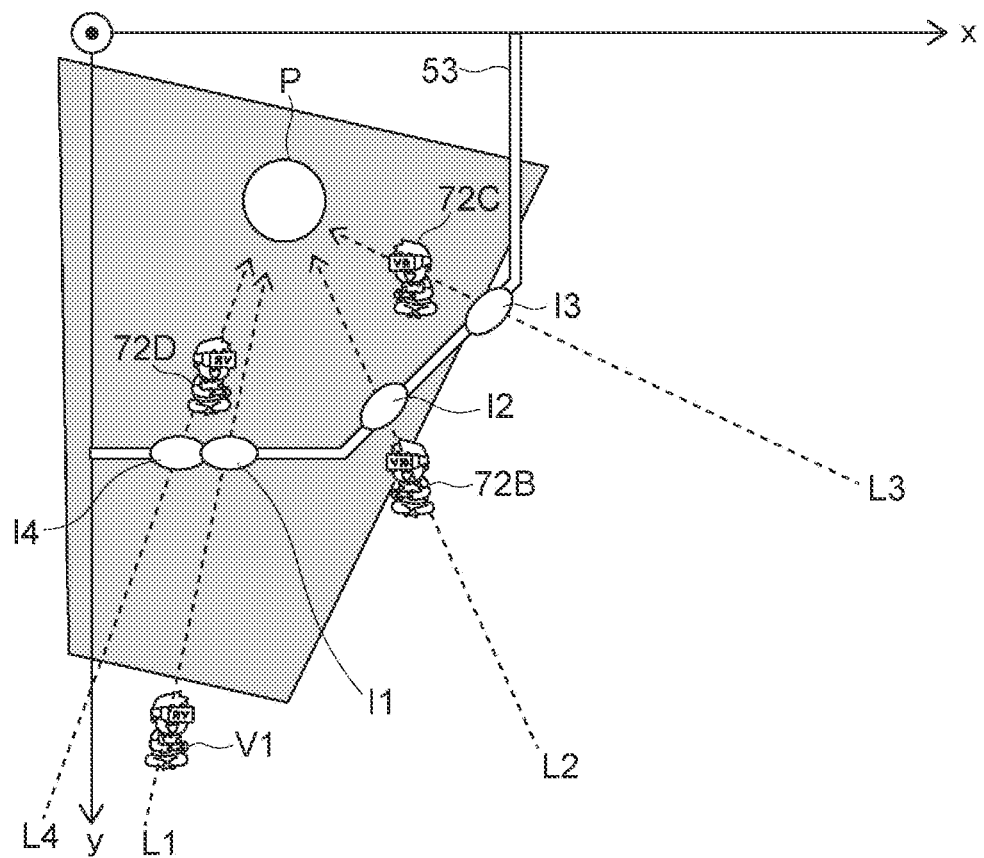
FIG. 19 is a diagram showing a state in which information representing viewing states of other viewers is added to the content that a certain viewer views in the case of FIG. 18.

FIG. 18 shows a case where the performer P, a plurality of virtual viewers V, and the display 53 have a certain positional relationship. At that time, if avatar content representing the viewing state of the other viewer is added to the content viewed by the viewer V1 on the basis of the viewing position of the other viewer or the position of the avatar image 71 of the other viewer, as shown in FIG. 19, the additional content (avatar content 72) appears in the vicinity of the intersection coordinates I within the viewing cone of the viewer 1, and there is a possibility that the viewing of the distribution content of the viewer V1 is hindered.

Figure 20:
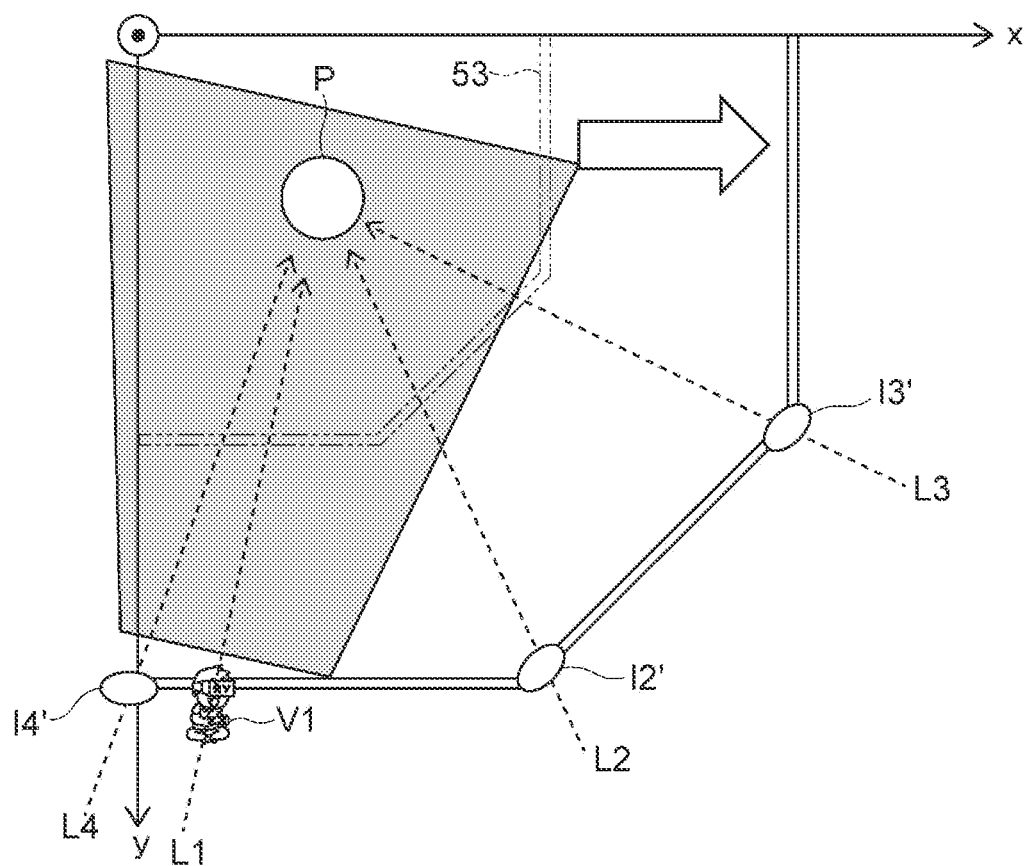
FIG. 20 is a diagram showing a state in which the information representing the viewing states of the viewers is added to the content that a certain viewer views in the case of FIG. 18 by virtually moving and enlarging the display.

To cope with this problem, as shown in FIG. 20, the content creation server 400 virtually moves and enlarges the display 53 with reference to the position of the viewer V1 and uses the intersection of the line of sight of the other viewer and the virtual display 53 as the display position of the additional content, and can thus add the content expressing the viewing state of the other viewer to the distribution content without hindering the viewing of the viewer V1.

The position and size of the virtual display may be arbitrarily changed. For example, the content creation server 400 may set the virtual display to be certainly behind the viewing position of the viewer V1 with respect to the content.

Further, the content creation server 400 may use any plane or spherical surface or a combination thereof instead of the virtual display to determine an intersection with the line of sight of the other viewer, and use the intersection as a display position of the additional content.

If the number of viewers is large, when the avatar images 71 of all the viewers are added to the content, the processing load of the content creation server 400 may increase, or the quality of the entire content may deteriorate due to excessive densification of the additional content.

On the other hand, the viewer information management server 100 may share the viewing state only with members of a group or a community to which each viewer belongs (for example, acquired from an SNS or the like). Further, the content creation server 400 may replace the avatar content 72 of the viewer with an image that is easier to draw (lower resolution).

Adjustment of Reproduction Position of Effect

When the effect added in response to the effect adding request is shared between the viewers, the effect adding position may be appropriately adjusted. Three specific cases are described herein, but the present technology is not limited thereto.

(Case 1: Reproduction of Effect within Each Viewer's Viewing Cone)

Even if a certain effect is reproduced in response to an adding request from another viewer, the viewer cannot notice the effect unless the effect is reproduced within the viewing cone.

Figure 21:
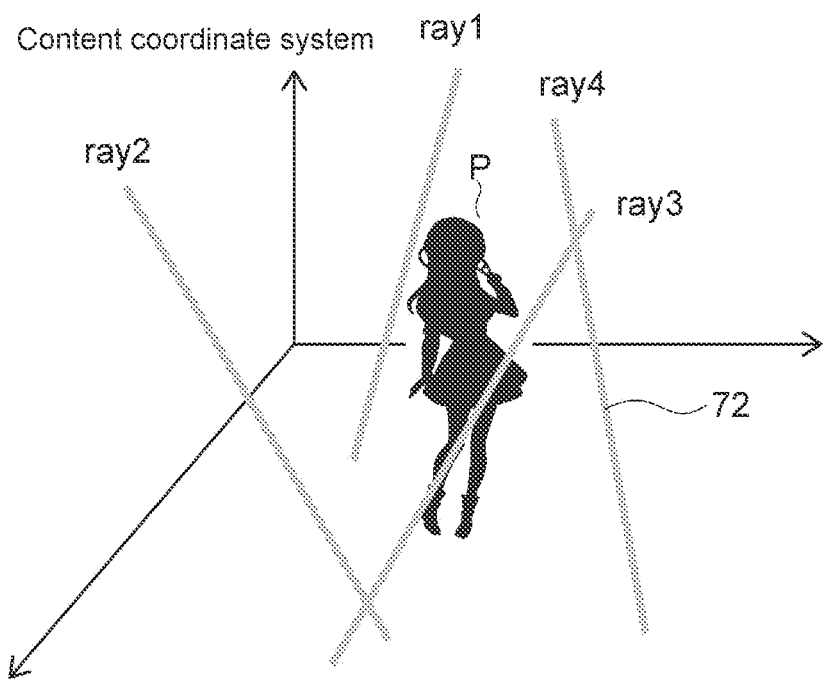
FIG. 21 is a diagram showing a reproduction example of an effect of light by a request from a viewer in the content distribution system.

For example, as shown in FIG. 21, suppose an effect called "Random Rays" in which the effect of rays is reproduced randomly in the content coordinate system. When this effect is reproduced, the number of rays that each viewer can see varies depending on the position of the viewing cone of each viewer.

On the other hand, the content creation server 400 can keep the quality of the reproduction effect seen by each viewer constant by adjusting the reproduction position of the effect such that the effect is reproduced within the viewing cone of each viewer.

Figure 22:
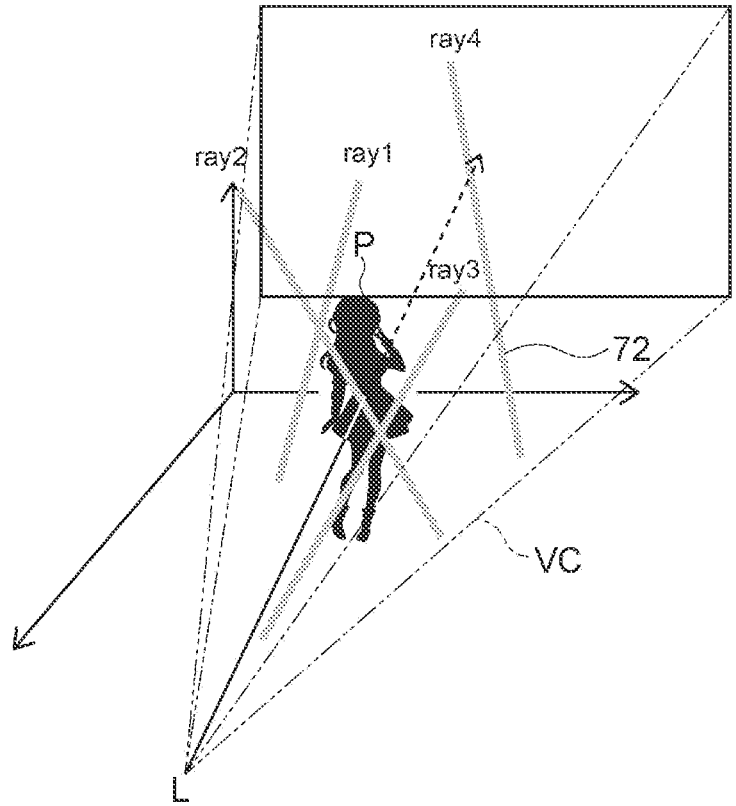
FIG. 22 is a diagram showing an adjustment example of the reproduction position of the effect of FIG. 21.

FIG. 22 shows how the effect reproduction position of "Random Rays" requested by the other viewer is adjusted in accordance with the viewing cone VC of the viewer 1. The upper drawing of the figure shows the position before the adjustment, and the lower drawing of the figure shows the position after the adjustment. The reproduction positions of a ray 2 and a ray 4, which are located outside the viewing cone VC in the upper drawing, are adjusted so as to be visible within the viewing cone VC in the lower drawing.

The creation of the viewing cone VC for determining the effect reproduction position as described above may be centered on the viewer's line-of-sight direction or may be centered on the head direction.

(Case 2: Adjustment of Center of Effect Generation According to Line-of-Sight Direction of Each Viewer and Position of Performer)

If an effect requested to be added by a certain viewer is added to content distributed to another viewer in the same manner, it may hinder viewing of a viewer who is viewing the distributed content from a viewpoint different from that of the viewer who has issued the request.

For example, there is a case where an effect requested by another viewer is reproduced in a space between the viewer and the performer. As one of means for avoiding this problem, when an effect with or without a specific attribute is to be reproduced in a space between a viewer and a performer, the viewer output system 200 of that viewer stops the reproduction of the target effect. However, if this means is used, there is a possibility that a certain viewer cannot see the effect requested by other viewers having different viewpoints.

To cope with this problem, each viewer output system 200 may adjust the center of reproduction effect generation according to the line-of-sight direction of each viewer and the position of the performer.

Here, it is considered that the center of the effect generation is set in a performer coordinate system defined with the position of the performer as a reference. The center of effect generation is a coordinate serving as a reference for determining a reproduction position of an effect with or without a specific attribute.

Figure 23:
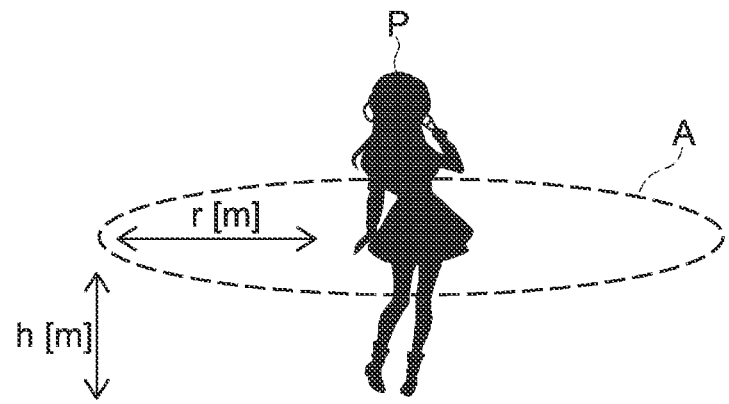
FIG. 23 is a diagram showing a region capable of setting the center of effect generation, which is set to be centered at a performer in the content distribution system.

FIG. 23 shows a region A in which the center of effect generation can be set with the performer P as the center. Here, as an example, a circle having a radius r[m] horizontal to the ground is set to have a height h[m], and the center thereof is set as the performer P, but the method of setting the region A is not limited.

Figure 24:
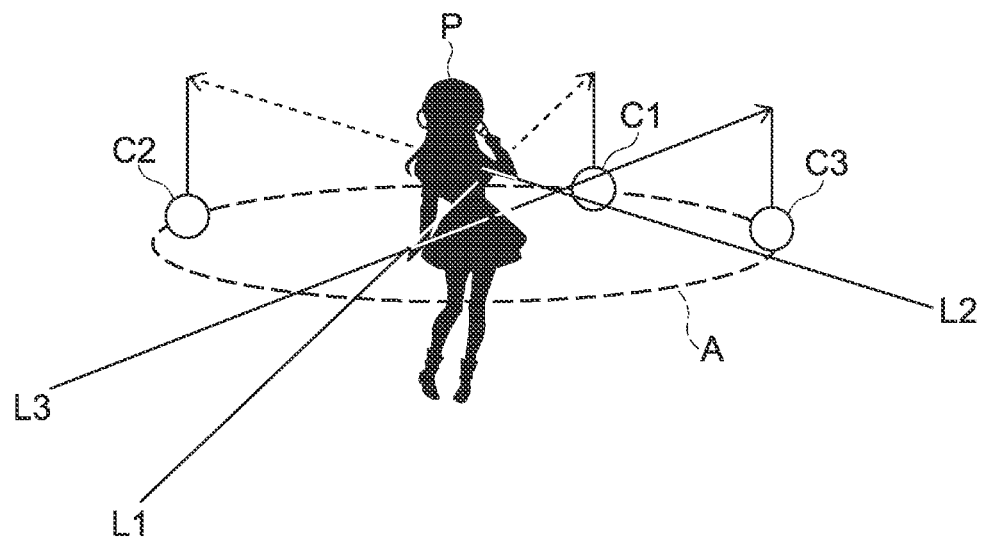
FIG. 24 is a diagram showing a state in which the center of effect generation is set for each viewer using the region set in the example of FIG. 23.

FIG. 24 shows a state in which the center of effect generation C is set for each viewer by using the above-mentioned set region A. The center of effect generation C is set by mapping the line of sight L of each viewer to a plane where the center-of-effect-generation settable region A exists, and by using one intersection distant from the viewer among the intersections between the mapped line of sight and the center-of-effect-generation settable region A.

In the figure, it is found that different centers of effect generation C1 to C3 are set for each viewer. In the state of the figure, for example, if the viewer 2 (corresponding to the line of sight L2) issues a certain effect reproduction request, the viewer output system 200A of the viewer 1 (corresponding to the line of sight L1) reproduces the effect at the position of the center of effect generation C1 of the viewer 1, and the output system 200C of the viewer 3 reproduces the effect at the position of the center of effect generation C3 of the viewer 3.

As a result, the effect requested by another viewer can be viewed without preventing any viewer from viewing the distribution content.

The setting processing of the region A and the center of effect generation C may be executed by not each viewer output system 200 but the content creation server 400 receiving the line-of-sight parameters of the respective viewers from the respective viewer output systems 200 directly or via the viewer information management server 100.

(Case 3: Adjustment of Effect Reproduction Position According to Line-of-Sight Direction of Each Viewer and Effect Attribute)

The reproduction position of an effect having a specific attribute is adjusted by using the line-of-sight direction of the viewer and the attribute of the background content, so that the effect reproduction appropriate for each viewer becomes possible.

Figure 25:
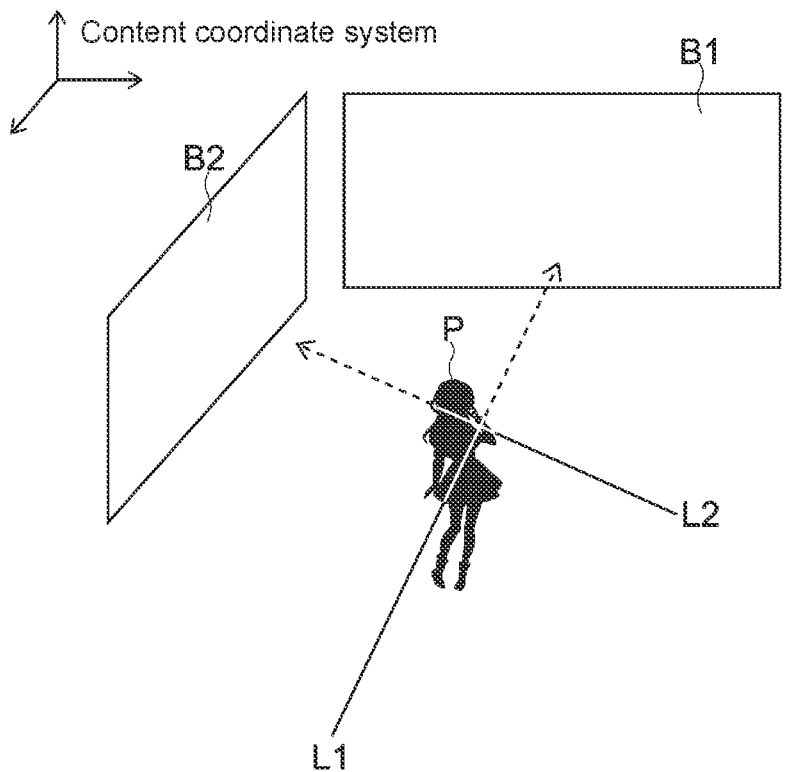
FIG. 25 is a diagram showing an example in which the background content having different plane parameters is arranged for each viewer having different lines of sight in the content distribution system.

As an example, an effect to be reproduced has a text attribute, and the effect having such a text attribute is defined to be reproduced on a plane of the background content having a certain extent or more. In FIG. 25, background content Plane 1 and background content Plane 2 having different plane parameters are disposed ahead of the lines of sight (L1 and L2) of the viewer 1 and the viewer 2, respectively.

Figure 26:
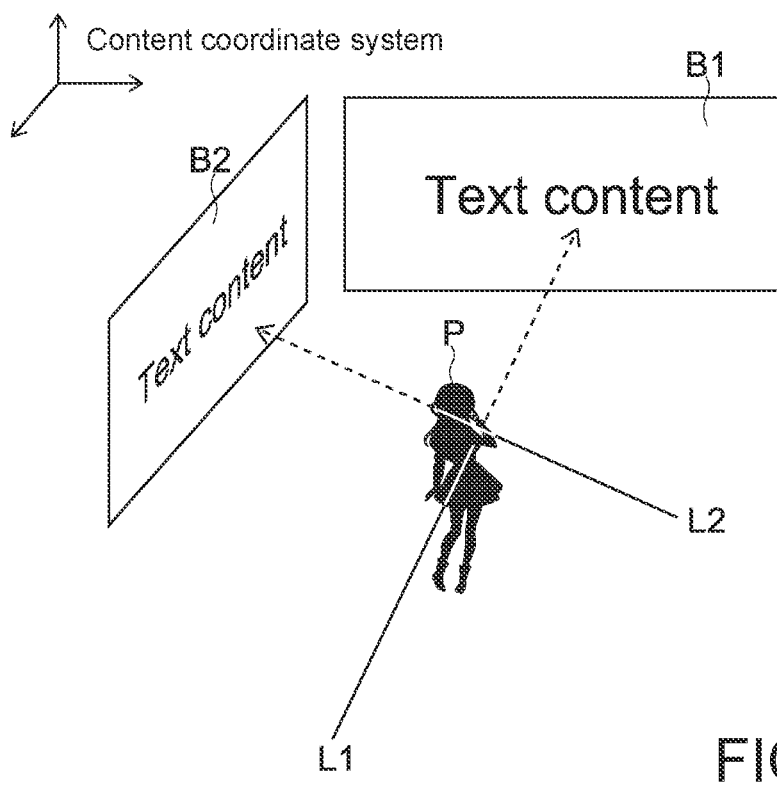
FIG. 26 is a diagram showing a reproduction example of the effect in the case of FIG. 25.

At that time, if a reproduction request of the effect having the text attribute is generated, as shown in FIG. 26, the viewer output system 200A of the viewer 1 reproduces the effect on the Plane 1, and the viewer output system 200B of the viewer 2 reproduces the effect on the Plane 2.

Thus, the effect having the text attribute can be reproduced in a form suitable for each viewer. Note that if an appropriate plane does not exist ahead of the line of sight of the viewer, it is conceivable that a virtual plane is created behind the performer as viewed from the viewer, and the effect is reproduced on the plane.

The display processing of each background content may be executed by not each viewer output system 200 but the content creation server 400 receiving the line-of-sight parameters of the respective viewers from the respective viewer output systems 200 directly or via the viewer information management server 100.

Processing of Adding Effect to Distribution Content and Processing Position

If a large amount of effect reproduction requests are generated, there arise problems such as a distribution delay due to an increase in the amount of processing of adding effects to the distribution content and an increase in communication data. In order to avoid such problems, processing of filtering the reproduction requests may be performed using the line-of-sight information of the viewers.

For example, the content creation server 400 may reflect, in the content to be distributed to a certain viewer, only an effect reproduction request of another viewer having the line-of-sight parameter close to that of the certain viewer.

In addition, it is also conceivable that the effectiveness of the effect may be adjusted depending on the number of viewers who are simultaneously viewing. For example, in the case of the "Random Rays" effect described with reference to FIGS. 21 and 22, the content creation server 400 may set the number of rays to be reproduced to n in response to one reproduction request if the number of viewers who are simultaneously viewing is X or more, and may set the number of rays to y, which is larger than the above-mentioned x, if the number of viewers who are simultaneously viewing is not less than Y, which is larger than the above-mentioned X.

Further, the content creation server 400 does not add an effect, the reproduction position of which is determined according to the viewer's line-of-sight information, to the content distributed from the content distribution server 500, but transmits the information relating to the effect to each viewer output system 200 to add the effect, which makes it possible to reduce the load on the content creation server 400 and the content distribution server 500.

Use of Different Reproduction Methods Depending on Attribute of Effect

As a method of changing the reproduction method depending on the attribute of the effect, the following attributes are conceivable in addition to those described above.

For example, the following attributes are conceivable: an effect having an attribute to change or not change the display posture according to the line-of-sight direction of a viewer; an effect having an attribute to change or not change the display posture according to the direction of the performer; an effect having an attribute that is not displayed in the viewing cone between the viewer and the performer; an effect having an attribute to perform reproduction using the distance between the viewer and the performer as a parameter; an effect having an attribute to perform reproduction using the degree of coincidence of the lines of sight between the performer and the viewer as a parameter; and the like.

As described above, according to this embodiment, the content distribution system enables the performer to grasp the virtual line of sight of the viewer in the same space as that of the performer, and enables the performer to perform an appropriate performance according to the reaction of the viewer even for the viewer at a remote location.

Along with the above, the performer and the viewer can communicate as if they are physically close to each other even at a remote location.

Further, since each viewer can set an effect reproduction request in accordance with the input device of each viewer, the same request can be transmitted from any device. (Differences caused by the possessed devices are absorbed.)

Further, since the action of the viewer is mapped to the effect ID and transmitted to the viewer information management server 100, the amount of communication data for expressing the action of the viewer is greatly reduced.

Further, since the content distributor creates effects that can be requested, for example, malicious actions that occur in communications where any text is available are eliminated.

Further, the content distribution system reflects the action of the viewer in the distribution content, and thus the viewers who are viewing the common content can share the experience.

Further, the content distribution system can differentiate services provided for each viewer by controlling effects that can be requested to be reproduced and added for each viewer.

MODIFIED EXAMPLES

The present invention is not limited to the embodiments described above, and various modifications may be made thereto without departing from the gist of the present invention.

In the embodiment described above, it is conceived that when it is determined that a specific communication has been established between the performer and the viewer, the viewer information providing server 100 or the content creation server 300 adds a special effect to the distribution content of a target viewer or the distribution content of all the viewers to enhance the communication experience. The establishment of the specific communication includes, for example, a case where the lines of sight of the performer and the viewer are matched, a case where a specific effect reproduction request of the viewer for a specific performance of the performer is received, and the like.

The viewer information management server 100 or the content creation server 300 only needs to determine whether or not the lines of sight of the performer and the viewer are matched, for example, on the basis of whether or not the line of sight of the performer faces in the direction of the avatar image 71 of a certain viewer on the display and whether or not the absolute value of the inner product of the line of sight vectors of the performer and the viewer is less than such a predetermined threshold value that both the line of sight vectors become substantially parallel.

Further, when the lines of sight of the performer and the viewer are matched, the viewer information management server 100 may output a special visual effect or sound effect from the vicinity of the avatar image (intersection coordinates) corresponding to the viewer on the display 53.

Further, the viewer information management server 100 counts the number of times the line of sight is matched with each viewer, so that a value indicating how frequently the lines of sight are matched in each direction can be displayed as a histogram in association with the intersection coordinates I of the display 53. On the basis of such information, the performer gives a performance in a direction in which the line of sight is less frequently matched with that of the viewer, thereby increasing the degree of satisfaction of the viewers as a whole.

Figure 14:
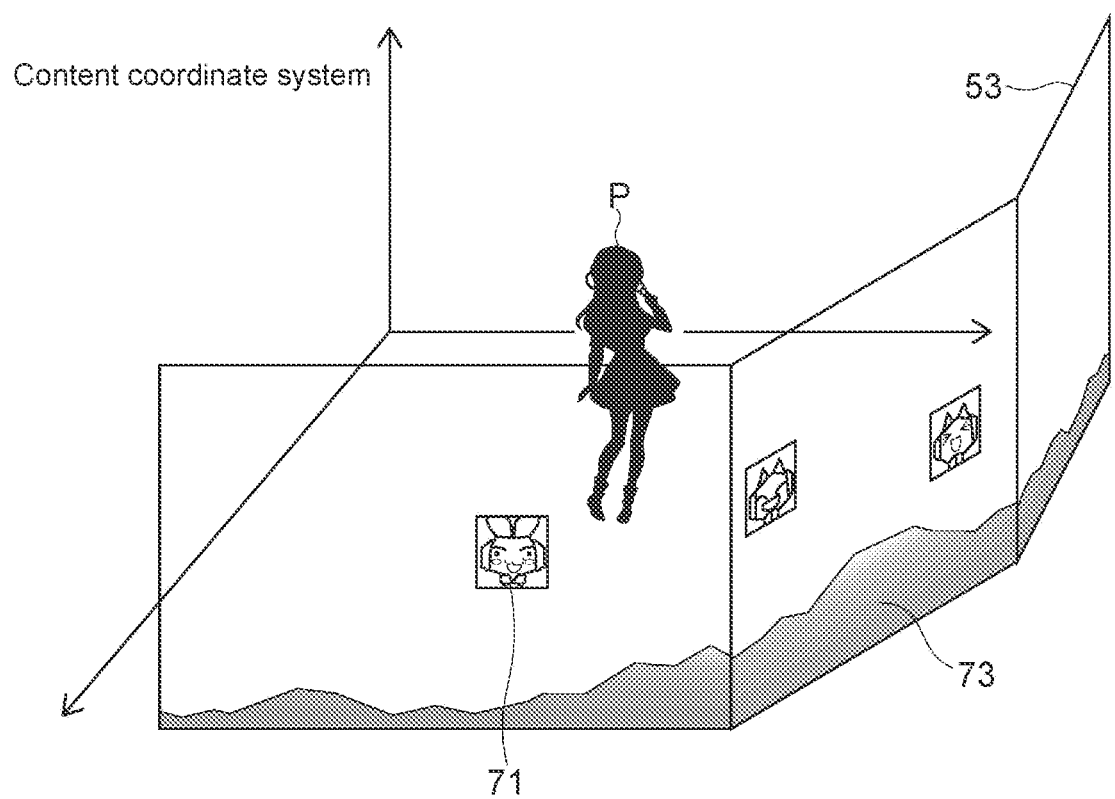
FIG. 14 is a diagram showing a display example of a histogram showing the number of times the lines of sight of the performer and the viewer are matched in the content distribution system.

FIG. 14 shows an example in which a frequency histogram 73 indicating the above-mentioned frequency is displayed on the display 53. As the value of the frequency histogram 73, it is conceivable to use a value obtained by dividing the total number of times the line of sight has been matched with that of the viewer present in each direction by the number of viewers present in that direction.

Further, the performer and the viewer can perform communication close to the actual experience even at a remote location, and thus it is possible to provide an additional value to a specific viewing position in a live streaming service.

For example, on the assumption that the performer frequently communicates for a specific viewing position, the content distribution system can create a high value-added viewing position, for example, while charging a higher viewing fee than usual for viewers who use that position and limiting the number of viewers who can use that viewing position.

In the embodiment described above, the content is imaged by the cameras 51 fixed to the imaging studio. However, instead of the cameras 51, the content may be imaged by, for example, a drone while moving.

[Others]

The present technology may also take the following configurations.

(1) An information processing system, including a controller that
acquires viewing state information together with viewer identification information from terminals of a plurality of viewers that are reproducing content in which a performance of a performer is imaged via a network in real time, the viewing state information indicating a line of sight or a position of each viewer in a coordinate system of a space where the viewer is present, the viewer identification information identifying the viewer, and
adds an effect to the content for each of the viewers on the basis of the acquired viewing state information.

(2) The information processing system according to (1), in which
the controller acquires attribute information indicating an attribute of the viewer together with the viewing state information and changes the effect in accordance with the attribute information.

(3) The information processing system according to (1) or (2), in which
the controller
calculates, when the effect is added to a first viewer of the plurality of viewers, coordinates of an intersection between a virtual plane set in the coordinate system of the space and the line of sight of a second viewer different from the first viewer, and
adds the effect at a position corresponding to the coordinates of the intersection in the content.

(4) The information processing system according to (3), in which
the controller sets the virtual plane behind a viewing position of the first viewer in the coordinate system of the space.

(5) The information processing system according to (3) or (4), in which
the controller sets a lower resolution for each effect corresponding to the second viewer as the number of the second viewers increases.

(6) The information processing system according to any one of (3) to (5), in which
the controller changes, if the coordinates of the intersection with the line of sight of the second viewer are outside of a viewing cone in the coordinate system of the first viewer, an adding position of the effect within the viewing cone.

(7) The information processing system according to (1) or (2), in which
the controller adds the effect for each of the plurality of viewers at a position corresponding to coordinates of an intersection distant from each viewer in two intersections between a region set to be centered at a position of the performer in the coordinate system of the space where the performer is present and the line of sight of each of the plurality of viewers.

(8) The information processing system according to (1) or (2), in which
the controller
adds the effect in response to an effect adding request including effect identification information indicating an attribute of the effect, the effect adding request being received from the terminal of each viewer, and
when the attribute indicated by the effect identification information is a planar effect, sets a predetermined plane for each viewer behind the performer in the coordinate system of the space where the performer is present and on the line of sight of each viewer, and adds the effect on the predetermined plane.

(9) The information processing system according to any one of (1) to (8), in which
the controller
adds the effect in response to an effect adding request received from the terminal of each viewer, and
when the effect is added to a first viewer of the plurality of viewers, adds the effect only in response to an effect adding request from a second viewer having a line of sight or a position within a predetermined distance of the line of sight or a position of the first viewer, among the effect adding requests of the plurality of viewers.

(10) The information processing system according to any one of (1) to (9), in which
the controller acquires information indicating the number of terminals of the viewers, the terminals being reproducing the content, and increases effectiveness of the added effect in accordance with the number.

(11) An information processing method, including:
acquiring viewing state information together with viewer identification information from terminals of a plurality of viewers that are reproducing content in which a performance of a performer is imaged via a network in real time, the viewing state information indicating a line of sight or a position of each viewer in a coordinate system of a space where the viewer is present, the viewer identification information identifying the viewer; and
adding an effect to the content for each of the viewers on the basis of the acquired viewing state information.

(12) A program, which causes an information processing apparatus to execute the steps of:
acquiring viewing state information together with viewer identification information from terminals of a plurality of viewers that are reproducing content in which a performance of a performer is imaged via a network in real time, the viewing state information indicating a line of sight or a position of each viewer in a coordinate system of a space where the viewer is present, the viewer identification information identifying the viewer; and adding an effect to the content for each of the viewers on the basis of the acquired viewing state information.

REFERENCE SIGNS LIST

11 CPU
18 input device
19 output device
20 storage device
26 imaging device
23 communication device
51 camera
52 microphone
53 display
71 avatar image
72 effect
73 histogram
100 viewer information management server
200 performer output system
300 viewer output system
400 content creation server
500 content distribution server
P performer
V viewer
L line of sight
VL virtual line of sight

The invention claimed is:

1. An information processing system, comprising a controller configured to
   acquire viewing state information together with viewer identification information from terminals of a plurality of viewers that are reproducing content in which a performance of a performer is imaged via a network in real time, the viewing state information indicating a line of sight or a position of each viewer in a coordinate system of a space where the viewer is present, the viewer identification information identifying the viewer, and
   add an effect to the content for one or more of the plurality viewers based on the acquired viewing state information,
   wherein the controller adds the effect in response to an effect adding request including effect identification information indicating an attribute of the effect, the effect adding request being received from the terminal of at least one viewer among the plurality of viewers, and
   wherein the controller is implemented via at least one processor.

2. The information processing system according to claim 1,
   wherein the controller is further configured to acquire attribute information indicating an attribute of the viewer together with the viewing state information and changes the effect in accordance with the attribute information.

3. The information processing system according to claim 1,
   wherein the controller is further configured to calculate, when the effect is added to a first viewer of the plurality of viewers, coordinates of an intersection between a virtual plane set in the coordinate system of the space and the line of sight of a second viewer different from the first viewer, and
   wherein the controller adds the effect at a position corresponding to the coordinates of the intersection in the content.

4. The information processing system according to claim 3,
   wherein the controller is further configured to set the virtual plane behind a viewing position of the first viewer in the coordinate system of the space.

5. The information processing system according to claim 3,
   wherein the controller is further configured to set a lower resolution for each effect corresponding to the second viewer as the number of the second viewers increases.

6. The information processing system according to claim 3,
   wherein the controller is further configured to change, if the coordinates of the intersection with the line of sight of the second viewer are outside of a viewing cone in the coordinate system of the first viewer, an adding position of the effect within the viewing cone.

7. The information processing system according to claim 1,
   wherein the controller adds the effect for each of the plurality of viewers at a position corresponding to coordinates of an intersection distant from each viewer in two intersections between a region set to be centered at a position of the performer in the coordinate system of the space where the performer is present and the line of sight of each of the plurality of viewers.

8. The information processing system according to claim 1,
   wherein the controller is further configured to set, when the attribute indicated by the effect identification information is a planar effect, a predetermined plane for each viewer behind the performer in the coordinate system of the space where the performer is present and on the line of sight of each viewer, and
   wherein the controller adds the effect on the predetermined plane.

9. The information processing system according to claim 1,
   wherein, when the effect is added to a first viewer of the plurality of viewers, the controller adds the effect only in response to the effect adding request received from a second viewer having a line of sight or a position within a predetermined distance of the line of sight or a position of the first viewer, among the effect adding requests of the plurality of viewers.

10. The information processing system according to claim 1,
    wherein the controller is further configured to
    acquire information indicating the number of terminals of the viewers, the terminals being reproducing the content, and
    increase effectiveness of the added effect in accordance with the number.

11. An information processing method, comprising:
    acquiring viewing state information together with viewer identification information from terminals of a plurality of viewers that are reproducing content in which a performance of a performer is imaged via a network in real time, the viewing state information indicating a line of sight or a position of each viewer in a coordinate system of a space where the viewer is present, the viewer identification information identifying the viewer; and adding an effect to the content for one or more of the plurality viewers based on the acquired viewing state information, wherein the effect is added in response to an effect adding request including effect identification information indicating an attribute of the effect, the effect adding request being received from the terminal of at least one viewer among the plurality of viewers.

12. A non-transitory computer-readable storage medium having embodied thereon a program, which when executed by an information processing apparatus of a computer causes the information processing apparatus to execute the steps of a method, the method comprising:

acquiring viewing state information together with viewer identification information from terminals of a plurality of viewers that are reproducing content in which a performance of a performer is imaged via a network in real time, the viewing state information indicating a line of sight or a position of each viewer in a coordinate system of a space where the viewer is present, the viewer identification information identifying the viewer; and adding an effect to the content for one or more of the plurality viewers based on the acquired viewing state information, wherein the effect is added in response to an effect adding request including effect identification information indicating an attribute of the effect, the effect adding request being received from the terminal of at least one viewer among the plurality of viewers.

* * * * *